US011216456B1

(12) United States Patent
Motik et al.

(10) Patent No.: US 11,216,456 B1
(45) Date of Patent: Jan. 4, 2022

(54) COMPLEX QUERY EVALUATION USING SIDEWAYS INFORMATION PASSING

(71) Applicant: Oxford Semantic Technologies Limited, Baynards Green (GB)

(72) Inventors: Boris Motik, Oxford (GB); Yavor Nenov, Eynsham (GB); Ian Horrocks, Oxford (GB)

(73) Assignee: OXFORD SEMANTIC TECHNOLOGIES LIMITED, Oxford (GB)

( * ) Notice: Subject to any disclaimer, the term of this patent is extended or adjusted under 35 U.S.C. 154(b) by 0 days.

(21) Appl. No.: 17/003,097

(22) Filed: Aug. 26, 2020

(51) Int. Cl.
*G06F 7/00* (2006.01)
*G06F 16/2453* (2019.01)
*G06F 16/22* (2019.01)
*G06F 16/901* (2019.01)
*G06F 16/9035* (2019.01)
*G06F 16/2455* (2019.01)
*G06F 16/215* (2019.01)

(52) U.S. Cl.
CPC ...... *G06F 16/24535* (2019.01); *G06F 16/215* (2019.01); *G06F 16/2246* (2019.01); *G06F 16/24542* (2019.01); *G06F 16/24554* (2019.01); *G06F 16/9024* (2019.01); *G06F 16/9035* (2019.01)

(58) Field of Classification Search
CPC ............... G06F 16/2246; G06F 16/215; G06F 16/24542; G06F 16/9035; G06F 16/24554; G06F 16/9024
USPC .................................. 707/769, 774, 999.003
See application file for complete search history.

(56) References Cited

U.S. PATENT DOCUMENTS

| 6,785,673 B1* | 8/2004 | Fernandez | G06F 40/143 |
| 2014/0040292 A1* | 2/2014 | Basak | G06F 16/27 707/756 |
| 2014/0172914 A1* | 6/2014 | Elnikety | G06F 16/9024 707/774 |

OTHER PUBLICATIONS

Harris "SPARQL 1.1 Query Language" W3C Recommendation Mar. 21, 2013; https://www.w3.org/TR/sparql11-query/). Cited in Specification.

* cited by examiner

*Primary Examiner* — Md I Uddin
(74) *Attorney, Agent, or Firm* — Rossi, Kimms & McDowell LLP

(57) ABSTRACT

A program stored on non-transitory computer-readable storage medium executes a method of evaluating a graph over a query. Decomposition instructions decompose the query into a plurality of subqueries. Evaluation instructions evaluate a subquery of the plurality of subqueries and generate a substitution multiset representing a result of the evaluation of the subquery. Filtration instructions or expansion instructions may operate upon the generated substitution set before passing the substitution set to a next subquery to be evaluated. The filtration instructions identify one or more mappings in the substitution multiset that cannot be safely passed to the second subquery and delete the identified one or more mappings from the substitution multiset. The expansion instructions determine, in a case where the subquery is operated upon by a non-distributive query operator, an expansion of the substitution multiset based at least on adding one or more new substitutions to the substitution multiset.

18 Claims, 10 Drawing Sheets

Algorithm 1 Renaming Existentially Quantified Variables

1: function rename($Q, \sigma$)
2:    if $Q = A$ then
3:       return $A\sigma$
4:    else if $Q = Q_1$ FILTER $E$ then
5:       $\nu := $ addToV($v(E) \setminus pv(Q_1)$)
6:       return rename($Q_1, \sigma$) FILTER $E\nu\sigma$
7:    else if $Q = Q_1$ BIND $x := E$ then
8:       $\nu := $ addToV($v(E) \setminus pv(Q_1)$)
9:       return rename($Q_1, \sigma$) BIND $x\sigma := E\nu\sigma$
10:    else if $Q = Q_1$ AND $Q_2$ then
11:       return rename($Q_1, \sigma$) AND rename($Q_2, \sigma$)
12:    else if $Q = Q_1$ UNION $Q_2$ then
13:       return rename($Q_1, \sigma$) UNION rename($Q_2, \sigma$)
14:    else if $Q = Q_1$ MINUS $Q_2$ then
15:       $\xi := \sigma_{|_{pv(Q_1) \cap pv(Q_2)}} \cup $ addToV($pv(Q_2) \setminus pv(Q_1)$)
16:       return rename($Q_1, \sigma$) MINUS rename($Q_2, \xi$)
17:    else if $Q = Q_1$ OPT$_E$ $Q_2$ then
18:       $\nu := $ addToV($v(E) \setminus (pv(Q_1) \cup pv(Q_2))$)
19:       return rename($Q_1, \sigma$) OPT$_{E\nu\sigma}$ rename($Q_2, \sigma$)
20:    else if $Q = $ AGG($Q_1, \vec{x}, \vec{z}, z := f(\vec{E})$) then
21:       $\xi := \sigma_{|_{pv(Q_1) \cap \vec{x}}} \cup $ addToV($pv(Q_1) \setminus \vec{x}$)
22:       $\nu := $ addToV($\bigcup_{i=1}^{n} v(E_i) \setminus pv(Q_1)$)
23:       return AGG(rename($Q_1, \xi$), $\vec{x}\sigma, \vec{z}\sigma, z\sigma := f(\vec{E}\nu\xi)$)
24:    else if $Q = $ DISTINCT($Q_1$) then
25:       return DISTINCT(rename($Q_1, \sigma$))
26:    else if $Q = Q_1$ ORDER BY $\vec{x}$ then
27:       return rename($Q_1, \sigma$) ORDER BY $\vec{x}\sigma$
28:    else if $Q = Q_1$ PROJECT $\vec{x}$ then
29:       $\xi := \sigma_{|_{pv(Q_1) \cap \vec{x}}} \cup $ addToV($pv(Q_1) \setminus \vec{x}$)
30:       return rename($Q_1, \xi$) PROJECT $\vec{x}\sigma$
31:    else if $Q = $ SUBQUERY-GROUP($Q_1$) then
32:       return SUBQUERY-GROUP(rename($Q_1, \sigma$))

33: function addToV($X$)
34:    $\xi := \emptyset$
35:    for $x \in X$ do
36:       if $x \in V$ then
37:          let $z$ be a 'globally fresh' variable (i.e., a new variable not used elsewhere)
38:          $\xi := \xi \{x \mapsto z\}$,    $V := V \cup \{z\}$
39:       else
40:          $V := V \cup \{x\}$
41:    return $\xi$

Algorithm 2 Basic Query Evaluation (I)

42:  function eval($A, \sigma$)
43:      for each substitution $\mu$ such that $\text{dom}(\mu) = v(A) \setminus \text{dom}(\sigma)$ and $A\sigma\mu \in G$ do output $\sigma \cup \mu$
44:  function eval($Q_1$ FILTER $E, \sigma$)
45:      for each $\mu \in \text{eval}(Q_1, \sigma|_{\overline{v(E) \setminus pv(Q_1) \setminus sv(Q_1)}})$ such that $\sigma \sim \mu$ and $[E]_\mu == \text{true}$ do output $\sigma \cup \mu$
46:  function eval($Q_1$ BIND $x := E, \sigma$)
47:      for each $\mu \in \text{eval}(Q_1, \sigma|_{\overline{v(E) \setminus pv(Q_1) \setminus sv(Q_1)}})$ such that $\sigma \sim \mu$ do
48:          $xval := [E]_\mu$
49:          if $xval \neq \epsilon$ and $x \notin \text{dom}(\sigma)$ then output $\sigma \cup \mu \cup \{x \mapsto xval\}$
50:          else if $xval = \epsilon$, or $x \in \text{dom}(\sigma)$ and $\sigma(x) = xval$ then output $\sigma \cup \mu$
51:  function eval($Q_1$ AND $Q_2, \sigma$)
52:      for each $\mu_1 \in \text{eval}(Q_1, \sigma)$ do
53:          for each $\mu_2 \in \text{eval}(Q_2, \mu_1)$ do
54:              output $\mu_2$
55:  function eval($Q_1$ UNION $Q_2, \sigma$)
56:      for each $\mu \in \text{eval}(Q_1, \sigma)$ do output $\mu$
57:      for each $\mu \in \text{eval}(Q_2, \sigma)$ do output $\mu$
58:  function eval($Q_1$ MINUS $Q_2, \sigma$)
59:      for each $\mu_1 \in \text{eval}(Q_1, \sigma|_{\overline{pv(Q_2) \setminus pv(Q_1) \setminus sv(Q_1)}})$ such that $\sigma \sim \mu_1$ do  ▷ Variables in $pv(Q_2) \setminus pv(Q_1)$ are hidden, so $pv(Q_2) \cap (pv(Q_1) \setminus sv(Q_1))$ is OK below
60:          $joins := \text{false}$
61:          if $sv(Q_1) \cap sv(Q_2) = \emptyset$ then
62:              if $\exists \mu_2 \in \text{eval}(Q_2, \emptyset)$ such that $\mu_1 \sim \mu_2$ and $\text{dom}(\mu_1) \cap \text{dom}(\mu_2) \neq \emptyset$ then $joins := \text{true}$
63:          else
64:              if $\exists \mu_2 \in \text{eval}(Q_2, \mu_1)$ then $joins := \text{true}$
65:          if $joins == \text{false}$ then output $\sigma \cup \mu_1$
66:  function eval($Q_1$ OPT $Q_2, \sigma$)
67:      for each $\mu_1 \in \text{eval}(Q_1, \sigma|_{\overline{v(E) \setminus pv(Q_2) \setminus pv(Q_1) \setminus sv(Q_1)}})$ such that $\sigma \sim \mu_1$ do
68:          $joins := \text{false}$
69:          for each $\mu_2 \in \text{eval}(Q_2, \mu_1)$ such that $[E]_{\mu_2} == \text{true}$ do
70:              $joins := \text{true}$
71:              if $\sigma \sim \mu_2$ then output $\sigma \cup \mu_2$
72:          if $joins == \text{false}$ then output $\sigma \cup \mu_1$

COMPLEX QUERY EVALUATION USING SIDEWAYS INFORMATION PASSING

TECHNICAL FIELD

Aspects of this disclosure generally are related to the field of data modeling and retrieval techniques, and more specifically to non-transitory computer-readable storage media that store a program to execute a computer-implemented method of retrieving data by evaluating a query using sideways information passing over a graph that models the data.

BACKGROUND OF THE INVENTION

The Resource Description Framework (RDF) is a family of World Wide Web Consortium (W3C) specifications originally designed as a metadata data model. It has come to be used as a general method for conceptual description or modeling of information that is implemented in web resources, using a variety of syntax notations and data serialization formats. The RDF Data Model is based on the idea of making statements about resources in expressions of the form subject-predicate-object, known as triples. The subject denotes the resource, and the predicate denotes traits or aspects of the resource and expresses a relationship between the subject and the object. A collection of RDF statements intrinsically represents a labeled, directed multigraph. However, in practice, RDF data is often stored in a relational database or native representations (often called triplestores).

So for example, an RDF database containing data relating to television might have person_X, person_Y and programme_Z as items that can be subjects and/or objects, and relations such as appeared_in and was_directed_by as predicates, allowing such triples as <person_X, appeared_in, programme_Z> and <programme_Z, was_directed_by, person_Y> to be stored. A feature of RDF databases is that the items used as subjects and objects, and the relations used as predicates, are represented using standardised Uniform Resource Identifiers (URIs), which can be used by any creator of a database.

The predominant query language for RDF graphs is SPARQL. SPARQL is a semantic query language able to retrieve and manipulate data stored in an RDF graph or database. The syntax of SPARQL is quite complex and with many redundancies, which makes it very awkward to use in complex algorithms. Moreover, it is common for RDF databases to use an "equality" predicate owl:sameAs in facts, terms and so on. Intuitively, an equality predicate indicates that a subject and object in a fact refer to the same underlying "thing", i.e. that they are equal.

For example, facts such as <USA, owl:sameAs, US> and <US, owl:sameAs, America> indicate that the different terms USA, US, and America all refer to the same thing (country). A rule using the predicate might, for example, be: <Obama, presidentOf, x>→<x, owl:sameAs, USA> which indicates that if Obama is the president of something, that something must be the same as the USA, even if a different term (such as US or America) is used for it. A corresponding predicate owl:differentFrom to indicate that a subject and object do not refer to the same underlying thing may also be used.

SPARQL queries can be (heavily) nested; i.e., the outer level query can have subqueries as components. For example, a query Q=Q1 MINUS Q2 is made up of two subqueries Q1 and Q2, with the answer to Q being the answer to Q1 minus the answer to Q2. Q1 and Q2 could themselves contain subqueries and this nesting of queries can continue to arbitrary depth. In order to make query answering more efficient and to use less memory, the query can be evaluated using sideways information passing (SIP). In the above example, SIP would permit the answers to Q1 to be passed sideways to Q2 for evaluation, retaining only those answers to Q1 that are not answers to Q2 as answers to Q. SIP improves the performance of queries by filtering out unneeded data as early as possible in the analysis.

The above example is relatively simple, but SPARQL is a large language containing many operators for modifying/combining queries (for example, filter, bind, and, union, minus, distinct, project) as well as a large number of built-in functions ("built-ins") for manipulating values including, for example, arithmetic functions (such as plus, minus), aggregation (such as sum, max, min) and string manipulation (such as concatenate, sub-string). Evaluating queries with built-ins or aggregates over graphs that contain equality is most efficiently dealt with by replacing equal resources with representatives, which conventional systems do not handle. Moreover, it is beneficial to evaluate queries over the representatives as much as possible as this reduces the number of substitutions considered. However, such a strategy does not work correctly with built-ins, which then see only the representatives. The conventional query evaluation methods limit SIP optimizations to basic SPARQL pattern-matching queries and do not work when evaluating queries with arbitrary SPARQL operators, built-ins or aggregates over graphs that contain equality The present invention seeks to mitigate the above-mentioned problems. In particular, the present invention seeks to provide improved computer-implemented methods of evaluating a query over an RDF graph by selectively modifying intermediate query results to account for equalities in the logical facts stored in the graph, and by selectively filtering the intermediate query results to permit use of sideways information passing while evaluating arbitrary SPARQL queries, possibly containing built-ins and aggregate functions.

SUMMARY OF THE INVENTION

At least the above-discussed need is addressed, and technical solutions are achieved in the art by various embodiments of the present invention. In some embodiments, a program stored on a computer-readable storage medium executes a method of evaluating a graph over a query. Decomposition instructions decompose the query into a plurality of subqueries. Evaluation instructions evaluate a subquery of the plurality of subqueries and generate a substitution multiset representing a result of the evaluation of the subquery. Filtration instructions or expansion instructions may operate upon the generated substitution set before passing the substitution set to a next subquery to be evaluated. The filtration instructions identify one or more mappings in the substitution multiset that cannot be safely passed to the second subquery and delete the identified one or more mappings from the substitution multiset. The expansion instructions determine, in a case where the subquery is operated upon by a non-distributive query operator, an expansion of the substitution multiset based at least on adding one or more new substitutions to the substitution multiset.

In some embodiments, a computer-readable storage medium stores a program executable by one or more data processing devices of a data processing device system to evaluate a query over a graph. In some embodiments, the program comprises decomposition instructions configured to cause the data processing device system to decompose the query into a plurality of subqueries, each subquery of the plurality of subqueries being operated upon by a unary operator or combined with one or more other subqueries of the plurality of subqueries by a non-unary operator. In some embodiments, the program comprises first evaluation instructions configured to cause the data processing device system to evaluate a first subquery of the plurality of subqueries and generate a first substitution multiset representing a result of the evaluation of the first subquery, the first substitution multiset including one or more substitutions, at least one substitution including one or more mappings, each mapping of the at least one substitution being a mapping from a variable to a constant in the graph. In some embodiments, the program comprises first filtration instructions configured to cause the data processing device system to identify one or more mappings in the substitutions in the first substitution multiset that cannot be safely passed to the second subquery, and to delete the identified one or more mappings from the substitutions in the first substitution multiset to obtain a filtered first substitution multiset. In some embodiments, the program comprises second evaluation instructions configured to cause the data processing device system to evaluate a second subquery of the plurality of subqueries based at least on the filtered first substitution multiset and generate a second substitution multiset representing a result of the evaluation of the second subquery using the filtered first substitution multiset.

In some embodiments, the second substitution multiset includes (1) one or more substitutions of the filtered first substitution multiset, each of which may be expanded with one or more additional mappings, (2) one or more new substitutions that satisfy the second subquery, or (3) a combination of both (1) and (2).

In some embodiments, the mappings that cannot be safely passed to the second subquery include mappings where the mapped variable is not surely bound by the first subquery and is possibly bound by the second subquery.

In some embodiments, the program comprises second filtration instructions and third evaluation instructions. The second filtration instructions are configured to cause the data processing device system to identify one or more mappings in the substitutions in the second substitution multiset that cannot be safely passed to the third subquery, and to delete the identified one or more mappings from the substitutions in the second substitution multiset to obtain a filtered second substitution multiset. The third evaluation instructions are configured to cause the data processing device system to evaluate a third subquery of the plurality of subqueries based at least on the filtered second substitution multiset to generate a third substitution multiset representing a result of the evaluation of the third subquery using the filtered second substitution multiset.

In some embodiments, the first evaluation instructions and the first filtration instructions comprise a first iteration of a sequence of iterations, the second evaluation instructions and the second filtration instructions comprise a second iteration of the sequence of iterations, and the program comprises output instructions configured to output an output substitution multiset representing a result of evaluating a subquery in a last iteration of the sequence of iterations, the output substitution multiset representing an answer to the query.

In some embodiments, the program comprises representation instructions configured to cause the data processing device system to represent the plurality of subqueries as a query tree, wherein the root node of the query tree corresponds to the query, each intermediate node of the query tree corresponds to a compound subquery of the plurality of subqueries, and each leaf node of the query tree corresponds to a simple subquery of the plurality of subqueries.

In some embodiments, the program comprises generation instructions configured to cause the data processing device system to generate an execution plan for evaluating the plurality of subqueries based at least on the query tree, the execution plan defining the sequence of iterations.

In some embodiments, the program comprises expansion instructions configured to cause the data processing device system to, in a case where the first subquery is operated upon by a non-distributive query operator, determine an expansion of the first substitution multiset based at least on adding one or more new substitutions obtained by replacing equivalent constants for at least one constant mapped from a variable in at least one substitution of the first substitution multiset.

In some embodiments, the program further comprises normalisation instructions configured to cause the data processing device system to, in a case where the first subquery accesses data associated with the graph in an external repository, determine a contraction of the first substitution multiset based at least on modifying substitutions of the first substitution multiset by replacing a representative constant for at least one constant mapped from a variable in at least one substitution of the first substitution multiset and removing any duplicate substitutions from the first substitution multiset.

In some embodiments, a method of evaluating a query over a graph is executed by a programmed data processing device system. The programmed data processing device system may be communicatively connected to a processor-accessible memory device system and an input-output device system. In some embodiments the method comprises decomposing the query into a plurality of subqueries, each subquery of the plurality of subqueries being operated upon by a unary operator or combined with one or more other subqueries of the plurality of subqueries by a non-unary operator; evaluating a first subquery of the plurality of subqueries and generating a first substitution multiset representing a result of the evaluation of the first subquery, the first substitution multiset including one or more substitutions, at least one substitution including one or more mappings, each mapping of the at least one substitution being a mapping from a variable to a constant in the graph; identifying one or more mappings in the substitutions in the first substitution multiset that cannot be safely passed to the second subquery, and to deleting the identified one or more mappings from the substitutions in the first substitution multiset to obtain a filtered first substitution multiset; and evaluating a second subquery of the plurality of subqueries based at least on the filtered first substitution multiset and generating a second substitution multiset representing a result of the evaluation of the second subquery using the filtered first substitution multiset.

In some embodiments, a computer-readable storage medium stores a program executable by one or more data processing devices of a data processing device system to evaluate a query over a graph. In some embodiments, the program comprises decomposition instructions configured to cause the data processing device system to decompose the query into a plurality of subqueries, each subquery of the plurality of subqueries being operated upon by a unary operator or combined with one or more other subqueries of the plurality of subqueries by a non-unary operator. In some embodiments, the program comprises first evaluation instructions configured to cause the data processing device system to evaluate a first subquery of the plurality of subqueries and generate a first substitution multiset representing a result of the evaluation of the first subquery, the first substitution multiset including one or more substitutions, at least one substitution including one or more mappings, each mapping of the at least one substitution being a mapping from a variable to a constant in the graph. In some embodiments, the program comprises expansion instructions configured to cause the data processing device system to, in a case where the first subquery is operated upon by a non-distributive query operator, determine an expansion of the first substitution multiset based at least on adding one or more new substitutions obtained by replacing equivalent constants for at least one constant mapped from a variable in at least one substitution of the first substitution multiset. In some embodiments, the program comprises second evaluation instructions configured to cause the data processing device system to evaluate a second subquery of the plurality of subqueries based at least on the expanded first substitution multiset and generate a second substitution multiset representing a result of the evaluation of the second subquery using the expanded first substitution multiset.

In some embodiments, the second substitution multiset includes (1) one or more substitutions of the expanded first substitution multiset, each of which may be expanded with one or more additional mappings, (2) one or more new substitutions that satisfy the second subquery, or (3) a combination of both (1) and (2).

In some embodiments, the program comprises second expansion instructions and third evaluation instructions. The second evaluation instructions are configured to cause the data processing device system to, in a case where the second subquery is operated upon by a non-distributive query operator, determine an expansion of the second substitution multiset based at least on adding one or more new substitutions obtained by replacing equivalent constants for at least one constant mapped from a variable in at least one substitution of the second substitution multiset. The third evaluation instructions are configured to cause the data processing device system to evaluate a third subquery of the plurality of subqueries based at least on the expanded second substitution multiset to generate a third substitution multiset representing a result of the evaluation of the third subquery using the expanded second substitution multiset.

In some embodiments, the first evaluation instructions and the first expansion instructions comprise a first iteration of a sequence of iterations, the second evaluation instructions and the second expansion instructions comprise a second iteration of the sequence of iterations, and the program comprises output instructions configured to output an output substitution multiset representing a result of evaluating a subquery in a last iteration of the sequence of iterations, the output substitution multiset representing an answer to the query. In some embodiments, the program comprises generation instructions configured to cause the data processing device system to generate an execution plan for evaluating the plurality of subqueries based at least on the query tree, the execution plan defining the sequence of iterations.

In some embodiments, the program further comprises filtration instructions configured to cause the data processing device system to identify one or more mappings in the substitutions in the first substitution multiset that cannot be safely passed to the second subquery, and to delete the identified one or more mappings from the substitutions in the first substitution multiset to obtain a filtered first substitution multiset. In some embodiments, the mappings that cannot be safely passed to the second subquery include mappings where the mapped variable is not surely bound by the first subquery and is possibly bound by the second subquery.

In some embodiments, a method of evaluating a query over a graph is executed by a programmed data processing device system. The programmed data processing device system may be communicatively connected to a processor-accessible memory device system and an input-output device system. In some embodiments the method comprises decomposing the query into a plurality of subqueries, each subquery of the plurality of subqueries being operated upon by a unary operator or combined with one or more other subqueries of the plurality of subqueries by a non-unary operator; evaluating a first subquery of the plurality of subqueries and generating a first substitution multiset representing a result of the evaluation of the first subquery, the first substitution multiset including one or more substitutions, at least one substitution including one or more mappings, each mapping of the at least one substitution being a mapping from a variable to a constant in the graph; determining, in a case where the first subquery is operated upon by a non-distributive query operator, an expansion of the first substitution multiset based at least on adding one or more new substitutions obtained by replacing equivalent constants for at least one constant mapped from a variable in at least one substitution of the first substitution multiset; and evaluating a second subquery of the plurality of subqueries based at least on the expanded first substitution multiset and generate a second substitution multiset representing a result of the evaluation of the second subquery using the expanded first substitution multiset.

Each of any or all of the computer-readable storage medium systems described herein may be a non-transitory computer-readable storage medium system including or consisting of one or more non-transitory computer-readable storage mediums.

According to some embodiments, a computer program product includes program code portions for performing the steps of any or all of each of methods described herein, when the computer program product is executed by a computing device. Each of any or all of such computer program products may be stored on one or more computer readable storage mediums.

Various embodiments of the present invention may include systems, devices, or machines that are or include combinations or subsets of any or all of the systems, devices, or machines and associated features thereof described herein.

Further, all or part of any or all of the systems, devices, or machines discussed herein or combinations or subcombinations thereof may implement or execute all or part of any or all of the methods and processes discussed herein or combinations or subcombinations thereof.

Any of the features of all or part of any or all of the methods and processes discussed herein may be combined with any of the other features of all or part of any or all of the methods and processes discussed herein. In addition, a computer program product may be provided that comprises program code portions for performing some or all of any or all of the methods and processes and associated features thereof described herein, when the computer program product is executed by a computer or other computing device or device system. Such a computer program product may be stored on one or more computer-readable storage mediums, also referred to as one or more computer-readable data storage mediums.

In some embodiments, each of any or all of the computer-readable data storage medium systems (also referred to as processor-accessible memory device systems) described herein is a non-transitory computer-readable (or processor-accessible) data storage medium system (or memory device system) including or consisting of one or more non-transitory computer-readable (or processor-accessible) storage mediums (or memory devices) storing the respective program(s) which may configure a data processing device system to execute some or all of one or more of the methods and processes described herein.

Further, any or all of the methods and associated features thereof discussed herein may be implemented or executed by all or part of a device system, apparatus, or machine, such as all or a part of any of the systems, apparatuses, or machines described herein or a combination or subcombination thereof.

BRIEF DESCRIPTION OF THE DRAWINGS

It is to be understood that the attached drawings are for purposes of illustrating aspects of various embodiments and may include elements that are not to scale. It is noted that like reference characters in different figures refer to the same objects.

FIG. 7 illustrates an example of a rename function, according to some embodiments of the present invention.

FIG. 8 illustrates an example of a query evaluation function, according to some embodiments of the present invention.

FIG. 9 illustrates an example of another query evaluation function, according to some embodiments of the present invention.

DETAILED DESCRIPTION

Figure 1:
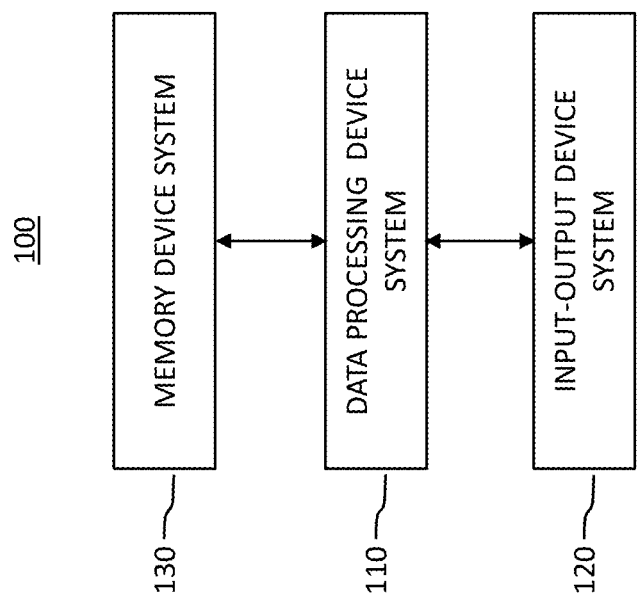
FIG. 1 shows a computing device system, according to some embodiments of the present invention.

In some embodiments of the present invention, the systems and methods described here evaluate a complex query over a graph. More specifically, the systems and methods described herein evaluate a SPARQL query over an RDF graph. It should be noted that the invention is not limited to these or any other examples provided herein, which are referred to for purposes of illustration only.

In this regard, in the descriptions herein, certain specific details are set forth in order to provide a thorough understanding of various embodiments of the invention. However, one skilled in the art will understand that the invention may be practiced at a more general level without one or more of these details. In other instances, well-known structures have not been shown or described in detail to avoid unnecessarily obscuring descriptions of various embodiments of the invention.

Any reference throughout this specification to "one embodiment", "an embodiment", "an example embodiment", "an illustrated embodiment", "a particular embodiment", and the like means that a particular feature, structure or characteristic described in connection with the embodiment is included in at least one embodiment. Thus, any appearance of the phrase "in one embodiment", "in an embodiment", "in an example embodiment", "in this illustrated embodiment", "in this particular embodiment", or the like in this specification is not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more. For example, the phrase, "a set of objects" means one or more of the objects.

In the following description, some embodiments of the present invention may be implemented at least in part by a data processing device system configured by a software program. Such a program may equivalently be implemented as multiple programs, and some or all of such software program(s) may be equivalently constructed in hardware.

Further, the phrase "at least" is or may be used herein at times merely to emphasize the possibility that other elements may exist beside those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least on A' includes A as well as the possibility of one or more other additional elements besides A. In the same manner, the phrase, 'based on A' includes A, as well as the possibility of one or more other additional elements besides A. However, the phrase, 'based only on A' includes only A. Similarly, the phrase 'configured at least to A' includes a configuration to perform A, as well as the possibility of one or more other additional actions besides A. In the same manner, the phrase 'configured to A' includes a configuration to perform A, as well as the possibility of one or more other additional actions besides A. However, the phrase, 'configured only to A' means a configuration to perform only A.

In addition, unless otherwise explicitly noted or required by context, the word "set" is intended to mean one or more. For example, the phrase, "a set of objects" means one or more of the objects. In addition, unless otherwise explicitly noted or required by context, the word "subset" is intended to mean a set having the same or fewer elements of those present in the subset's parent or superset. Moreover, unless otherwise explicitly noted or required by context, the word "set" is intended to include a multiset.

The word "device", the word "machine", the word "system", and the phrase "device system" all are intended to include one or more physical devices or sub-devices (e.g., pieces of equipment) that interact to perform one or more functions, regardless of whether such devices or sub-devices are located within a same housing or different housings. However, it may be explicitly specified according to various embodiments that a device or machine or device system resides entirely within a same housing to exclude embodiments where the respective device, machine, system, or device system resides across different housings. The word "device" may equivalently be referred to as a "device system" in some embodiments.

The phrase "derivative thereof" and the like is or may be used herein at times in the context of a derivative of data or information merely to emphasize the possibility that such data or information may be modified or subject to one or more operations. For example, if a device generates first data for display, the process of converting the generated first data into a format capable of being displayed may alter the first data. This altered form of the first data may be considered a derivative of the first data. For instance, the first data may be a one-dimensional array of numbers, but the display of the first data may be a color-coded bar chart representing the numbers in the array. For another example, if the above-mentioned first data is transmitted over a network, the process of converting the first data into a format acceptable for network transmission or understanding by a receiving device may alter the first data. As before, this altered form of the first data may be considered a derivative of the first data. For yet another example, generated first data may undergo a mathematical operation, a scaling, or a combining with other data to generate other data that may be considered derived from the first data. In this regard, it can be seen that data is commonly changing in form or being combined with other data throughout its movement through one or more data processing device systems, and any reference to information or data herein is intended to include these and like changes, regardless of whether or not the phrase "derivative thereof" or the like is used in reference to the information or data, unless otherwise required by context. As indicated above, usage of the phrase "or a derivative thereof" or the like merely emphasizes the possibility of such changes. Accordingly, the addition of or deletion of the phrase "or a derivative thereof" or the like should have no impact on the interpretation of the respective data or information. For example, the above-discussed color-coded bar chart may be considered a derivative of the respective first data or may be considered the respective first data itself.

The term "program" in this disclosure should be interpreted to include one or more programs including as a set of instructions or modules that may be executed by one or more components in a system, such as a controller system or data processing device system, in order to cause the system to perform one or more operations. The set of instructions or modules may be stored by any kind of memory device, such as those described subsequently with respect to the memory device system 130, 151, or both, shown in FIGS. 1 and 2, respectively. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). Such descriptions should be deemed to be equivalent to describing that the instructions or modules are configured to cause the performance of the action. The word "module" may be defined as a set of instructions. The word "program" and the word "module" may each be interpreted to include multiple sub-programs or multiple sub-modules, respectively. In this regard, reference to a program or a module may be considered to refer to multiple programs or multiple modules.

Further, it is understood that information or data may be operated upon, manipulated, or converted into different forms as it moves through various devices or workflows. In this regard, unless otherwise explicitly noted or required by context, it is intended that any reference herein to information or data includes modifications to that information or data. For example, "data X" may be encrypted for transmission, and a reference to "data X" is intended to include both its encrypted and unencrypted forms, unless otherwise required or indicated by context. However, non-usage of the phrase "or a derivative thereof" or the like nonetheless includes derivatives or modifications of information or data just as usage of such a phrase does, as such a phrase, when used, is merely used for emphasis.

Further, the phrase "graphical representation" or "graph" used herein is intended to include a visual representation presented via a display device system and may include computer-generated text, graphics, animations, or one or more combinations thereof, which may include one or more visual representations originally generated, at least in part, by an image-capture device.

Figure 4:
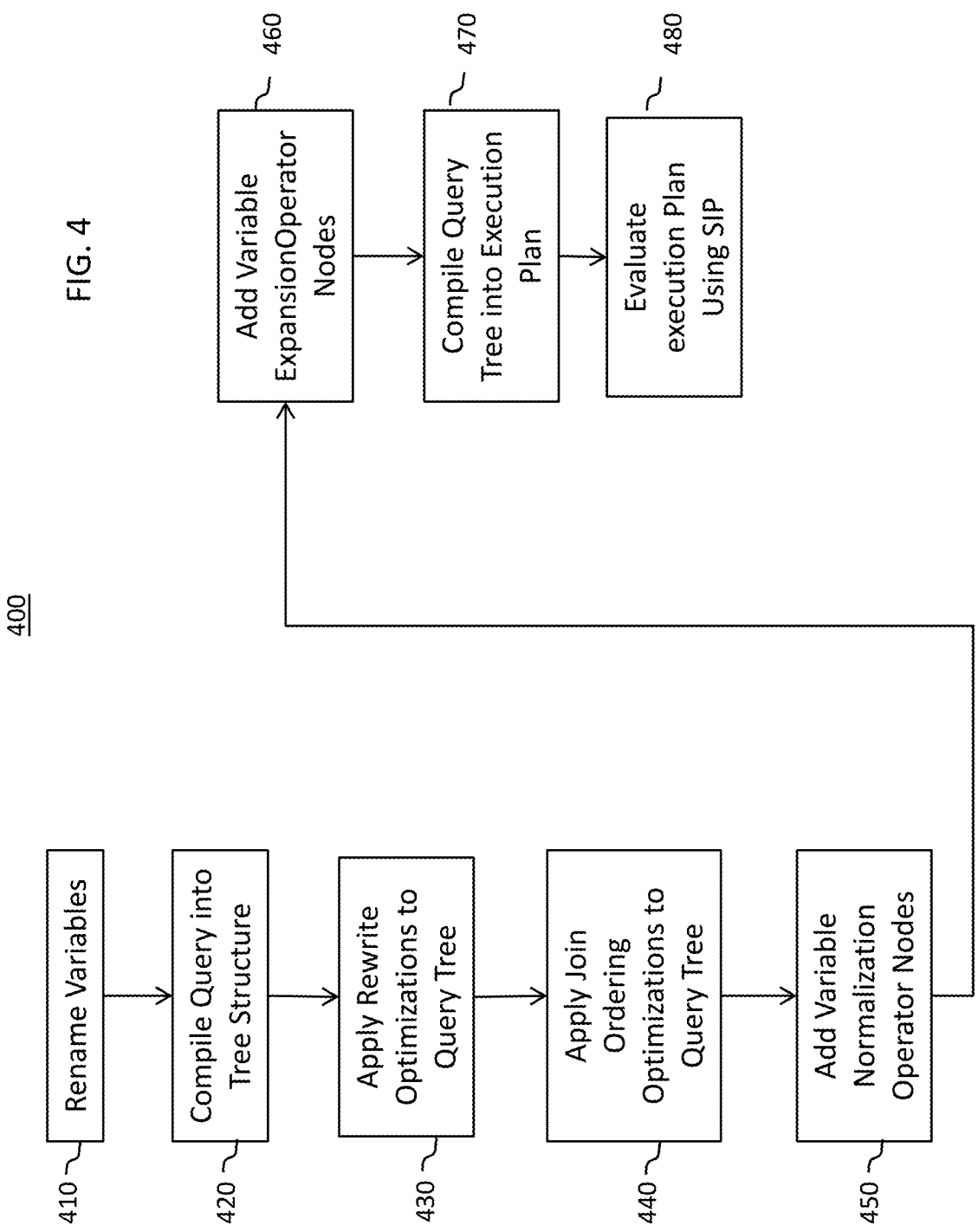
FIG. 4 is a flowchart showing a method of evaluating a query over a graph, according to some embodiments of the present invention.
Figure 5:
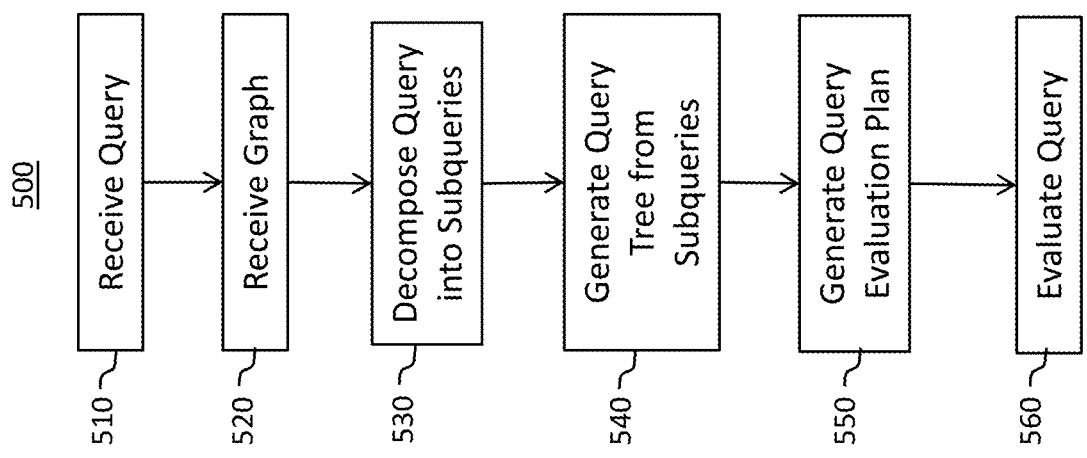
FIG. 5 is a flowchart showing another method of evaluating a query over a graph, according to some embodiments of the present invention.
Figure 6:
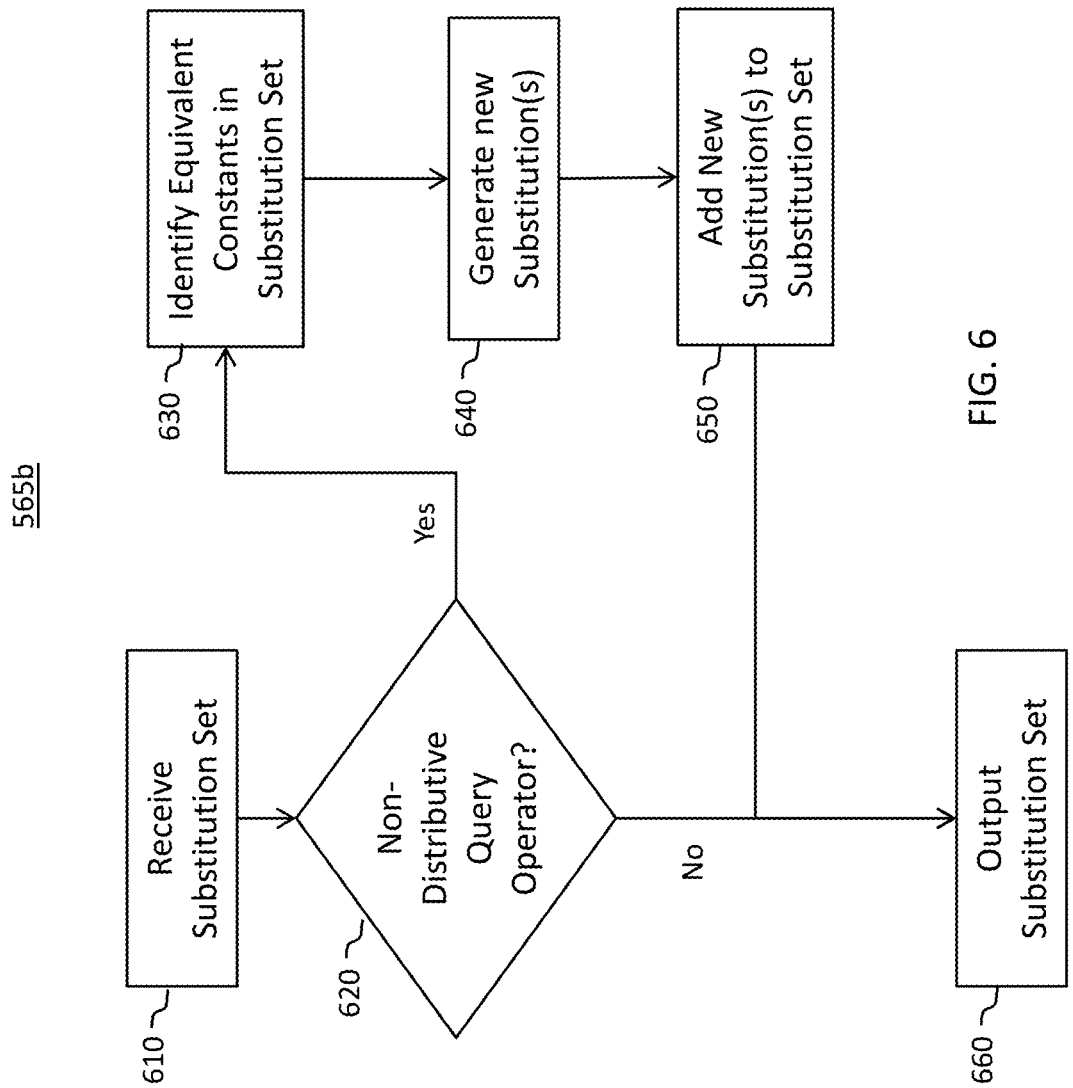
FIG. 6 is a flowchart showing a method of expanding the results of evaluating a query to include equivalent constants, according to some embodiments of the present invention.

Further still, example methods are described herein with respect to FIGS. 4-6. Such figures are described to include blocks associated with computer-executable instructions. It should be noted that the respective instructions associated with any such blocks herein need not be separate instructions and may be combined with other instructions to form a combined instruction set. The same set of instructions may be associated with more than one block. In this regard, the block arrangement shown in method FIGS. 4-6 herein is not limited to an actual structure of any program or set of instructions or required ordering of method tasks, and such method FIGS. 4-6, according to some embodiments, merely illustrates the tasks that instructions are configured to perform, for example upon execution by a data processing device system in conjunction with interactions with one or more other devices or device systems.

Figure 2:
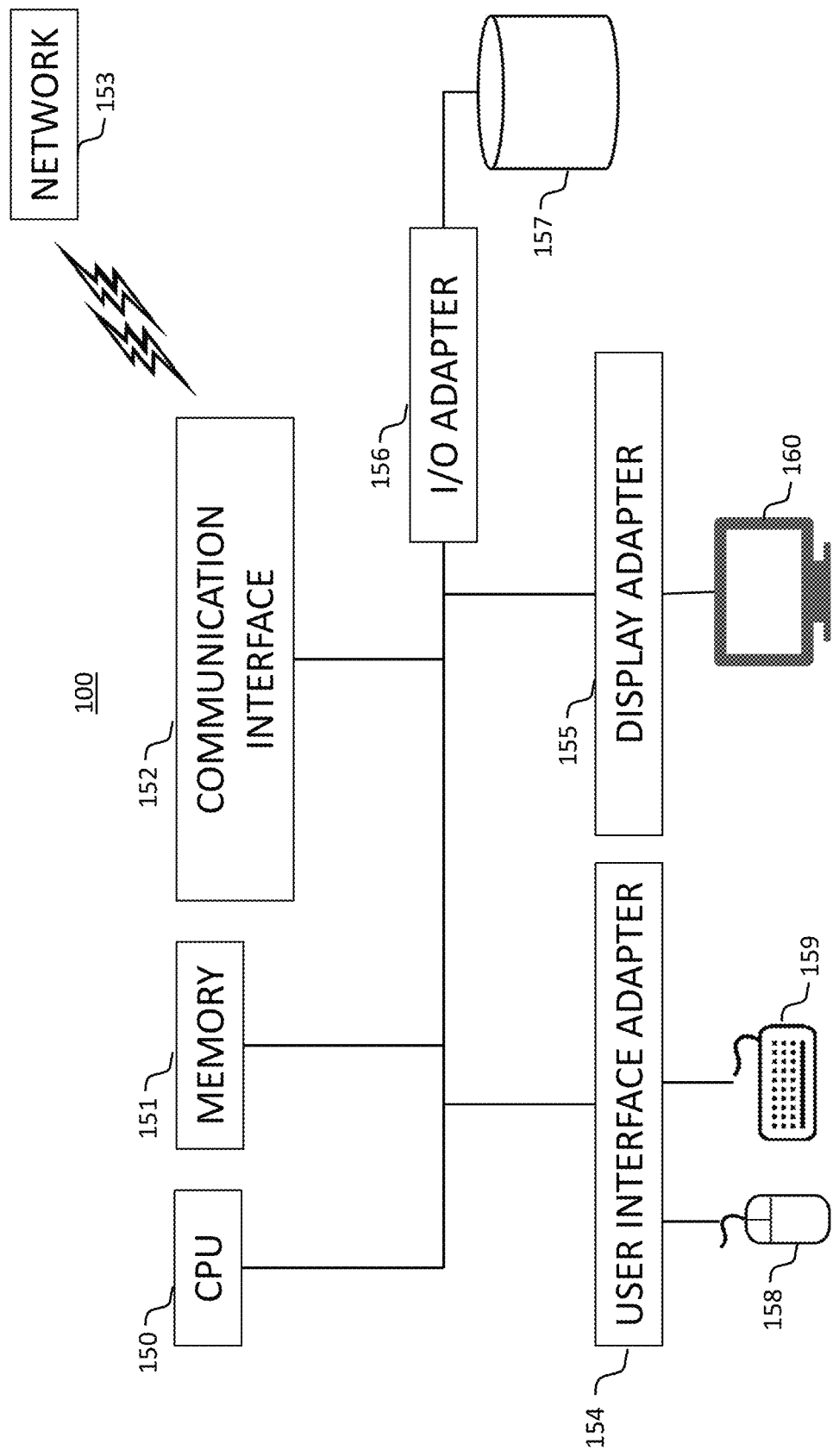
FIG. 2 shows another computing device system, according to some embodiments of the present invention.

FIG. 1 schematically illustrates a system 100 according to some embodiments. In some embodiments, the system 100 may be a computing device 100 (as shown in FIG. 2). In some embodiments, the system 100 includes a data processing device system 110, an input-output device system 120, and a processor-accessible memory device system 130. The processor-accessible memory device system 130 and the input-output device system 120 are communicatively connected to the data processing device system 110.

The data processing device system 110 includes one or more data processing devices that implement or execute, in conjunction with other devices, such as one or more of those in the system 100, control programs associated with some of the various embodiments. Each of the phrases "data processing device", "data processor", "processor", and "computer" is intended to include any data processing device, such as a central processing unit ("CPU"), a desktop computer, a laptop computer, a mainframe computer, a tablet computer, a personal digital assistant, a cellular phone, and any other device configured to process data, manage data, or handle data, whether implemented with electrical, magnetic, optical, biological components, or other.

The memory device system 130 includes one or more processor-accessible memory devices configured to store information, including the information needed to execute the control programs associated with some of the various embodiments. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device.

Each of the phrases "processor-accessible memory" and "processor-accessible memory device" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs (Read-Only Memory), and RAMs (Random Access Memory). In some embodiments, each of the phrases "processor-accessible memory" and "processor-accessible memory device" is intended to include a non-transitory computer-readable storage medium. In some embodiments, the memory device system 130 can be considered a non-transitory computer-readable storage medium system.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending upon the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device, the system 100 of FIG. 1 can be implemented by a single application-specific integrated circuit (ASIC) in some embodiments.

The input-output device system 120 may include a mouse, a keyboard, a touch screen, another computer, or any device or combination of devices from which a desired selection, desired information, instructions, or any other data is input to the data processing device system 110. The input-output device system 120 may include any suitable interface for receiving information, instructions or any data from other devices and systems described in various ones of the embodiments.

The input-output device system 120 also may include an image generating device system, a display device system, a speaker device system, a processor-accessible memory device system, or any device or combination of devices to which information, instructions, or any other data is output from the data processing device system 110. In this regard, if the input-output device system 120 includes a processor-accessible memory device, such memory device may or may not form part or all of the memory device system 130. The input-output device system 120 may include any suitable interface for outputting information, instructions or data to other devices and systems described in various ones of the embodiments. In this regard, the input-output device system may include various other devices or systems described in various embodiments.

FIG. 2 shows an example of a computing device system 100, according to some embodiments. The computing device system 100 may include a processor 150, corresponding to the data processing device system 110 of FIG. 1, in some embodiments. The memory 151, input/output (I/O) adapter 156, and non-transitory storage medium 157 may correspond to the memory device system 130 of FIG. 1, according to some embodiments. The user interface adapter 154, mouse 158, keyboard 159, display adapter 155, and display 160 may correspond to the input-output device system 120 of FIG. 1, according to some embodiments. The computing device 100 may also include a communication interface 152 that connects to a network 153 for communicating with other computing devices 100.

Various methods 400, 500 may be performed by way of associated computer-executable instructions according to some example embodiments. In various example embodiments, a memory device system (e.g., memory device system 130) is communicatively connected to a data processing device system (e.g., data processing device systems 110, otherwise stated herein as "e.g., 110") and stores a program executable by the data processing device system to cause the data processing device system to execute various embodiments of methods 400, 500 via interaction with at least, for example, various databases 330, 340 shown in FIG. 3. In these various embodiments, the program may include instructions configured to perform, or cause to be performed, various ones of the instructions associated with execution of various embodiments of methods 400, 500. In some embodiments, methods 400, 500 may include a subset of the associated blocks or additional blocks than those shown in FIGS. 4-6. In some embodiments, methods 400, 500 may include a different sequence indicated between various ones of the associated blocks shown in FIGS. 4-6.

In some embodiments, results of SPARQL queries are generated by manipulating sets, which are written using the standard mathematical notation: {a, b, c} is a set containing elements a, b, and c; the empty set is written ∅; and set membership (∈), subset (⊆), set union (∪), set intersection (∩), and set difference (\) are defined in the standard way. The set-builder notation of the form {x∈S| some condition on x} defines the set containing exactly those elements of S for which the specified conditions holds.

SPARQL uses bag semantics—that is, answers to SPARQL queries can contain repeated elements. To capture this formally, some functions may return multisets rather than sets. A multiset is like a set, but it can contain repeated elements. To distinguish multisets from sets, multisets are written as $\{\{\ldots\}\}$. For example, $\{\{a, b, b, c, c, c,\}\}$ is a multiset that contains element a once, element b twice, and element c three times. An empty multiset is also denoted by ∅. Finally, set operators ∈, ⊆, ∪, ∩, and \ can be applied to multisets using standard semantics. The following examples show how multiset operators work in practice.

a∈ $\{\{$a, b, b, b, c, c$\}\}$ is true, but d∈ $\{\{$a,b,b,b,c,c$\}\}$ is not.
$\{\{$a,b$\}\}$ ⊆ $\{\{$a,b,b,b,c,c$\}\}$ is true, but $\{\{$a,a,b$\}\}$ ⊆ $\{\{$a,b,b,b,c,c$\}\}$ is not.
$\{\{$a,b,b,b,c,c$\}\}$ ∩ $\{\{$a,a,b,b,d$\}\}$=$\{\{$a,b,b$\}\}$.
$\{\{$a,b,b,b,c,c$\}\}$ ∪ $\{\{$a,a,b,b,d$\}\}$=$\{\{$a,a,a,b,b,b,b,c,c,d$\}\}$.
$\{\{$a,b,b,b,c,c$\}\}$\$\{\{$a,a,b,b,d$\}\}$=$\{\{$b,c,c$\}\}$.
For the multiset builder notation, let M=$\{\{$a,b,b,b,c,c$\}\}$; then,
$\{\{$x∈M|x comes alphabetically before c$\}\}$=$\{\{$a,b,b, b$\}\}$.

Sets and multisets can be freely mixed, in which case sets are 'promoted' to multisets. For example, $\{$a,b$\}$ ∪ $\{$a,a,b, c$\}\}$=$\{\{$a,b$\}\}$ ∪ $\{\{$a,a,b,c$\}\}$=$\{\{$a,a,b,b,c$\}\}$.

Although SPARQL variables start with a question mark, using this convention can be very cumbersome. Instead, in this specification, variables are written as possibly indexed letters x, y, or z. Similarly, resources are often written as lower- or uppercase letters/words such as a, b, or R. Sometimes resources are written using the Turtle prefix form, such as rdf:type. A term is a variable or a resource. An atom (often also called a triple pattern) is an expression of the form $\langle t_s, t_p, t_o\rangle$ where $t_s$, $t_p$, and $t_o$ are terms. A triple is an atom that does not contain any variables. Atoms are usually written using the uppercase letter A. Moreover, v(A) is the set of variables of the atom A; for example, v($\langle$x, a, y$\rangle$)=$\{$x, y$\}$. Finally, an RDF graph (or often just graph) G is a finite set of triples.

In some embodiments, evaluating SPARQL queries requires manipulating substitutions, which are sets of mappings of finitely many variables to resources. Although a substitution may be a set of zero or more mappings, it is referred to in this specification as a substitution. It is understood that a substitution includes a substitution set of zero or more mappings. Substitutions are usually denoted using lowercase Greek letters, such as β, σ, or ξ. The value of a substitution σ on a variable x is written as σ(x). A substitution can also be written explicitly as a set of mappings. For example, $\xi=\{x\mapsto a, y\mapsto b\}$ is a substitution that maps variable x to resource a, and variable y to resource b. Some examples of operations on substitutions include:

dom(σ) returns the domain of a substitution σ—that is, the set of variables on which σ is defined. For the example substitution ξ defined above, dom(ξ)=$\{$x,y$\}$.

$\sigma|_V$ is the projection of a substitution a to the set of variables V—that is, the result is a substitution that contains the same mappings as σ, but only for the variables in V. For our example substitution ξ above and V=$\{$x,z$\}$, we have $\xi|_V=\{x\mapsto a\}$—that is, the mapping for y is removed from because V does not contain y.

$\sigma|_{\overline{V}}=\sigma|_U$ where U=dom(σ)\V. In other words, the result of $\sigma|_{\overline{V}}$ is obtained from a by deleting the mappings for the variables contained in V. For our example substitution above and V=$\{$x,z$\}$, we have $\xi|_{\overline{V}}=\{y\mapsto b\}$—that is, the mapping for x is removed from because V contains x.

$\sigma_1\sim\sigma_2$ is true if $\sigma_1(x)=\sigma_2(x)$ for each x∈dom($\sigma_1$)∪dom ($\sigma_2$). In other words, $\sigma_1\sim\sigma_2$ means that the values of $\sigma_1$ and $\sigma_2$ coincide on each variable on which both substitutions are defined. For example, $\{x\mapsto a, y\mapsto b\}\sim\{x\mapsto a,z\mapsto b\}$ holds, whereas $\{x\mapsto a,y\mapsto b\}\sim\{x\mapsto b\}$ does not.

Aσ is the result of applying substitution a to atom A, which is obtained by replacing in A each variable x on which σ is defined with σ(x). For example, for A=$\langle$x, c, z$\rangle$ and ξ as above, Aξ=$\langle$a, c, z$\rangle$. Notation for applying substitutions can be chained; for example, Aa means 'first apply a to A, and then apply ξ to Aσ'.

Since substitutions are sets of mappings, the empty set ∅ is a valid substitution—that is, ∅ is a substitution that does not map any variable.

If $\mu_1$ and $\mu_2$ are substitutions such that $\mu_1\sim\mu_2$ holds, then $\mu_1\cup\mu_2$ is a substitution that contains all mappings of $\mu_1$ and $\mu_2$. Note that condition $\mu_1\sim\mu_2$ is essential: if it does not hold, then there exists a variable x∈dom($\mu_1$)∩dom ($\mu_2$) such that $\mu_1(x)\neq\mu_2(x)$, so the union of $\mu_1$ and $\mu_2$ is not well defined because it is unclear how to map x in the result.

In order to precisely describe the algorithms for evaluating SPARQL queries, one must first precisely specify what constitutes a syntactically legal SPARQL query, and next one must specify precisely what the desired output of each query is.

TABLE 1

The syntax of SPARQL

| | |
|---|---|
| Q ← A | evaluate a single atom in an RDF graph |
| Q1 FILTER E | return the answers of $Q_1$ that satisfy the built-in expression E |
| Q1 BIND z := E | extend the answers of $Q_1$ by mapping z to the value of E |
| Q1 AND Q2 | join the answers of $Q_1$ and $Q_2$ |
| Q1 UNION Q2 | return the union of the answers of $Q_1$ and $Q_2$ |
| Q1 MINUS Q2 | return the answers of $Q_1$ that do not join with $Q_2$ |
| Q1 $OPT_E$ Q2 | join the answers of $Q_1$ and $Q_2$ if possible |
| AGG(Q1; $\vec{x}$; z := f($\vec{E}$)) | group the answers of $Q_1$ on $\vec{x}$ and map z to the value of f($\vec{E}$) |
| DISTINCT(Q1) | eliminate duplicates from $Q_1$ |
| Q1 ORDER BY $\vec{x}$ | sort the answers of $Q_1$ on $\vec{x}$ |
| Q1 PROJECT $\vec{x}$ | evaluate $Q_1$ as a nested subquery and return the values of $\vec{x}$ |
| SUBQUERY-GROUP(Q1) | group the answers of $Q_1$ |

The syntax of SPARQL is quite complex and with many redundancies, which makes it very awkward to use in algorithms. In this specification, SPARQL is defined in terms of a simplified algebraic notation, whose grammar is shown in Table 1. A variant of this syntax is used in Section 18 of the SPARQL 1.1 specification (standards published and distributed online by the World Wide Web Consortium; https://www.w3.org/TR/sparql11-query/), the entire disclosure of which is hereby incorporated herein by reference, to specify the formal semantics of the language. The grammar defines a nonterminal query symbol Q. It uses several (non)terminals that are not further defined: A is an atom; E is a built-in expression constructed in the usual way; x and z are variables, $\vec{x}$ is a vector (i.e., a list) of variables $x_1, \ldots, x_n$; $f$ is an n-ary aggregate function; and $\vec{E}$ is a vector of n built-in expressions $E_1, \ldots, E_n$. Query $Q_1OPT_EQ_2$ is often abbreviated to $Q_1OPT\ Q_2$ if E=true.

RDFox is an exemplar implementation of the present invention, developed by the inventors of the present application, in the form of a highly scalable in-memory RDF triple store and semantic reasoning engine. The classes in the logic package of RDFox implement a variant of this notation and are used to represent SPARQL queries in RDFox. Thus, the SPARQL parser of RDFox does not represent the SPARQL queries in their original format, but rather translates them directly into the algebraic notation using the steps specified in Section 18.2 of the SPARQL 1.1 specification. The notation used to discuss the exemplar embodiments in this specification differs slightly from the one used in RDFox, but these differences are not significant and can be summarized as follows.

- In the embodiments discussed herein, Query $Q_1$ AND $Q_2$ has only two conjuncts, whereas RDFox supports an arbitrary number of conjuncts.
- In the embodiments discussed herein, $Q_1$ $OPT_E$ $Q_2$ has only two subqueries, whereas RDFox supports an arbitrary number of subqueries.
- Queries $Q_1$ PROJECT $\vec{x}$, DISTINCT($Q_1$), and $Q_1$ ORDER BY z are all represented in RDFox using one class Query, which thus captures the SPARQL queries of the form $$\text{SELECT[DISTINCT]}\vec{x} \text{ WHERE } \ldots \text{ ORDER BY } \vec{y}.$$

In the embodiments discussed herein, three separate expressions are used because they correspond more closely to individual operators that are used to implement query evaluation.

- The exemplar Query SUBQUERY-GROUP ($Q_1$) exists neither in the SPARQL 1.1 specification nor in the RDFox logic package. It is included here because it is used in RDFox to implement tree-shaped query plans. Specifically, this class can be used to implement evaluation of queries with bounded treewidth, which is currently an experimental query evaluation technique in RDF. The details of this technique are explained later. From a semantic point of view, SUBQUERY-GROUP ($Q_1$) does nothing, but it can dramatically affect query evaluation performance.

The structure of built-in expressions is constructed using the usual rules for constructing expressions. There is an assumption that, for each built-in expression E and substitution μ, one can compute the value of E using the values for the variables in μ. The result of this computation is written as $[[E]]_\mu$, and it can be a special 'error' value $\in$. For example, if μ={x ↦ 1, y ↦ >2}, then $[[x+y]]_\mu$=3 and $[[x+z]]_\mu$=$\in$. Note that μ does not need to specify the value of all variables in E.

Another assumption is that the value of aggregate functions can be computed. For example, let $f$ be an n-ary aggregate function, let $\vec{E}$ be a vector of n built-in expressions $E_1, \ldots, E_n$, and let M be a multiset of substitutions; then, $[[f(\vec{E})]]_M$ is the value of the aggregate function $f$ on the multiset N={{<$[[E_1]]_\mu, \ldots, [[E_n]]\mu$>|μ∈M}}. In other words, a multiset N containing the values of $E_1, \ldots, E_n$ evaluated for each substitution μ in M, is first constructed and then the aggregate function $f$ on N is evaluated. SPARQL 1.1 also supports distinct aggregates, where all duplicates are eliminated from N before the aggregate function is evaluated. Thus, any embodiments discussed herein can also be extended to integrate distinct aggregates in the conventional manner. Note that $[[f(\vec{E})]]_M$ can also return the 'error' value $\in$.

Notation $[[f(\vec{E})]]_M$ suggests that explicitly materializing the set M is needed to compute the value of the aggregate function. However, the value of many aggregate functions (and in fact of all aggregate functions that are included in the SPARQL 1.1 standard) can be computed without explicitly materializing M; for example, to compute the count, one just needs to maintain an integer that is incremented as one iterates over M. Thus, an aggregate function $f$ is typically implemented in databases by providing three plug-in functions.

- Function $init_f$ returns a new accumulator variable for $f$. This variable is an opaque data structure that will be updated during the iteration over M. For example, for the COUNT aggregate, the accumulator is an integer. For the AVG aggregate, the accumulator consists of an integer that keeps track of the number of items seen, and of a number that keeps track of the sum of the values seen.
- Function $inc_f$ (acc, m, $v_1, \ldots, v_n$) takes as argument an accumulator variable acc, an integer m, and n values $v_1, \ldots, v_n$, and it updates the accumulator by applying the values m times. The reason for passing m will become clearer later. For example, for the COUNT aggregate, this function adds m to the accumulator. For the AVG aggregate, this function adds m to the counter and adds m·$v_1$ to the sum.
- Function $finish_f$ (acc) takes an accumulator variable and converts it into the aggregate value. For example, for the COUNT aggregate, this function simply returns the accumulator value. For the AVG aggregate, this function returns the quotient of the sum and the counter.

All aggregates are implemented in RDFox in this way using classes in the aggregates package.

We next discuss the semantics of SPARQL queries—that is, for each query Q matching the SPARQL grammar and for each graph G, the desired output of Q on G, which is written $[[Q]]_G$, is defined. According to the SPARQL 1.1 specification, this result is a multiset of substitutions. Note that these substitutions can differ in the variables that they map—that is, not all substitutions in $[Q]_G$ are required to have the same domain. For example, let Q=⟨ x, rdf:type, C ⟩ OPT⟨ x, R, y ⟩, and let G be the graph containing triples ⟨ a, rdf:type, C ⟩, ⟨ b, rdf:type, C ⟩, and ⟨ b, R, c ⟩. Then, $[Q]_G$ contains two substitutions: {x ↦ a} and {x ↦ b, y ↦ c}.

TABLE 2

The semantics of SPARQL queries

| Q | $[Q]_G$ |
|---|---|
| A | {μ | dom (μ) = v(A) and Aμ ∈ G} |
| $Q_1$ FILTER E | {{μ ∈ $[Q_1]$ | $[[E]]$ = true}} |
| $Q_1$ BIND z := E | {{μ ∪ map(z,$[[E]]_\mu$ | μ ∈ $[Q_1]_G$}} |
| $Q_1$ AND $Q_2$ | {{$\mu_1 \cup \mu_2$ | $\mu_1 \in [Q_1]_G, \mu_2 \in [Q_2]_G$, and $\mu_1 \sim \mu_2$ }} |
| $Q_1$ UNION $Q_2$ | $[Q_1] \cup [Q_2]_G$ |
| $Q_1$ MINUS $Q_2$ | {$\mu_1 \in [Q_1]_G$ | $\forall \mu_2 \in [Q_2]_G : \mu_1 \not\sim \mu_2$ or dom ($\mu_1$) ∩ dom ($\mu_2$) = ∅ } |

TABLE 2-continued

The semantics of SPARQL queries

| Q | $[Q]_G$ |
|---|---|
| $Q_1 \text{ OPT}_E Q_2$ | $\{\{\mu_1 \cup \mu_2 \mid \mu_1 \in [Q_1]_G, \mu_2 \in [Q_2]_G, \mu_1 \sim \mu_2, \text{ and } [\![E]\!]_{\mu_1 \cup \mu_2} = \text{true}\}\} \cup \{\{\mu_1 \in [Q_1]_G \mid \forall \mu_2 \in [Q_2]_G : \mu_1 \not\sim \mu_2, \text{ or } [\![E]\!]_{\mu_1 \cup \mu_2} \neq \text{true}\}\}$ |
| $\text{AGG}(Q_1, \vec{x}, z := f(\vec{E}))$ | $\{\mu \cup \text{map}(z, [\![f(\vec{E})]\!]_{M_\mu}) \mid \mu \in \{\xi\vert_{\vec{x}} \mid \xi \in [Q1]_G\} \text{ and } M_\mu = \{\{v \in [Q_1]_G \mid \mu = v\vert_{\vec{x}}\}\}\}$ |
| $\text{DISTINCT}(Q_1)$ | $\{\mu \mid \mu \in [Q_1]_G\}$ |
| $Q_1 \text{ ORDER BY } \vec{x}$ | $[Q_1]_G \text{ sorted on } \vec{x}$ |
| $Q_1 \text{ PROJECT } \vec{x}$ | $\{\{\mu\vert_{\vec{x}} \mid \mu \in [Q1]_G\}\}$ |
| SUBQUERY-GROUP $(Q_1)$ | $[Q_1]_G$ |

The order of elements in a multiset is usually considered irrelevant. In SPARQL, however, the order may be important in some set operations in order to express the effects of sorting. For example, the $Q_1$ ORDER BY $\vec{x}$ operator produces ordered results, but any ordering guarantees are lost if the results of $Q_1$ ORDER BY $\vec{x}$ are combined with the results of other operators. Therefore, ordering in SPARQL is local to $Q_1$ ORDER BY $\vec{x}$ and can be implemented as such.

Table 2 specifies the formal semantics of SPARQL 1.1, according to some embodiments of the present invention. Table 2 includes an auxiliary function ma p (x, v), which takes as arguments a variable x and a value v, and returns the substitution $\{x \mapsto v\}$ if $v \neq \in$; otherwise it returns the empty substitution $\emptyset$. Essentially, Table 2 specifies how to evaluate queries inside-out, according to some embodiments of the present invention. For example, to evaluate $Q=Q_1$ AND $Q_2$, $[Q_1]_G$ and $[Q_2]_G$ are first computed; then all pairs of substitutions $\mu_1 \in [Q_1]_G$ and $\mu_2 \in [Q_2]_G$ are considered, and whether $\mu_1 \sim \mu_2$ holds is checked (i.e., check whether $\mu_1$ and $\mu_2$ are compatible and, for each compatible pair, output $\mu_1 \cup \mu_2$).

TABLE 3

Identifying surely and possibly bound variables, as well as equality-expanded variables.

| Q | sv(Q) | pv(Q) | ev(Q) |
|---|---|---|---|
| A | v(A) | v(A) | $\emptyset$ |
| $Q_1$ FILTER E | $sv(Q_1)$ | $pv(Q_1)$ | $ev(Q_1) \cup (pv(Q_1) \cap v(E))$ |
| Q1 BIND z := E | $sv(Q_1)$ | $pv(Q_1) \cup \{z\}$ | $ev(Q_1) \cup (pv(Q_1) \cap v(E)) \cup \{z\}$ |
| $Q_1$ AND $Q_2$ | $sv(Q_1) \cup sv(Q_2)$ | $pv(Q_1) \cup pv(Q_2)$ | $ev(Q_1) \cup ev(Q_2)$ |
| $Q_1$ UNION $Q_2$ | $sv(Q_1) \cap sv(Q_2)$ | $pv(Q_1) \cap pv(Q_2)$ | $ev(Q_1) \cup ev(Q_2)$ |
| $Q_1$ MINUS $Q_2$ | $sv(Q_1)$ | $pv(Q_1)$ | $ev(Q_1) \cup ev(Q_2)$ |
| $Q_1 \text{ OPT}_E Q_2$ | $sv(Q_1)$ | $pv(Q_1) \cup pv(Q_2)$ | $ev(Q_1) \cup (pv(Q_1) \cap v(E)) \cup (pv(Q_2) \cap v(E))$ |
| $\text{AGG}(Q_1, \vec{x}, z := f(\vec{E}))$ | $sv(Q_1) \cap \vec{x}$ | $(pv(Q_1) \cap \vec{x}) \cup \{z\}$ | $(ev(Q_1) \cap \vec{x}) \cup (v(\vec{E}) \cap \vec{x}) \cup \{z\}$ |
| $\text{DISTINCT}(Q_1)$ | $sv(Q_1)$ | $pv(Q_1)$ | $ev(Q_1)$ |
| $Q_1$ ORDER BY $\vec{x}$ | $sv(Q_1)$ | $pv(Q_1)$ | $ev(Q_1) \cup \vec{x}$ |
| $Q_1$ PROJECT $\vec{x}$ | $sv(Q_1) \cap \vec{x}$ | $pv(Q_1) \cap \vec{x}$ | $ev(Q_1) \cap \vec{x}$ |
| SUBQUERY-GROUP $(Q_1)$ | $sv(Q_1)$ | $pv(Q_1)$ | $ev(Q_1)$ |

While the constructs of SPARQL determine variable scope, as described in Section 18 of the SPARQL 1.1 specification, some embodiments of the present invention use a refined notion of variable scope.

The scope of variables in a query can be determined using two mutually recursive functions, sv(Q) and pv(Q), shown in Table 3. Table 3 also defines a function ev(Q), which is discussed in more detail later, but is convenient to discuss here so that its definition can be compared to that of pv(Q). Based on the semantics of SPARQL in Table 2, it can be seen that the result of these functions satisfies the following property: for each graph G and each query Q, each substitution $\mu \in [Q]_G$ satisfies $$sv(Q) \subseteq dom(\mu) \subseteq pv(Q).$$

Intuitively, sv(Q) returns the variables that are surely bound in each answer $\mu$ to Q on an arbitrary graph G, and pv(Q) contains the possibly bound variables. Note that pv(Q) always contains sv(Q).

In some embodiments of the present invention, one or more variables may be removed from the variable scope to uniquely identify independent variables that may have the same name but are essentially different variables. For example, let Q=⟨x, R, y⟩ AND (⟨x, S, y⟩ PROJECT x).

Due to the projection operator, variable y in ⟨x, R, y⟩ and variable y in ⟨x, S, y⟩ are essentially different variables: the value of the former is independent of the value of the latter. For the query evaluation algorithm, it will be beneficial to use different variable names in such cases. Therefore, as a first step in query processing, this query may be changed into the equivalent query Q'=⟨x, R, y⟩ AND (⟨x, S, z⟩ PROJECT x).

In some embodiments of the present invention, this step may be performed using a recursive function, for example rename, that uses a global set of variables V, which are initialised to pv(Q) before the function is invoked. FIG. 7 shows an example of an algorithm 700 of the function rename, implement in RDFox, according to some embodiments of the present invention. The function rename(Q, $\emptyset$) returns a query equivalent to Q with the same answer variables but with 'invisible' variables renamed. A 'globally fresh' variable can be added to replace an 'invisible' variable by maintaining a global counter and using its value to create a variable with a 'hard-to-guess' name.

The function rename tries to preserve the names of variables where possible in order to simplify debugging. For example, when applied to Q=⟨x, R, y⟩ AND (⟨x, S, z⟩ PROJECT x), the function returns Q—that is, variable z is not renamed because it does not clash with any other variables in the query.

In the context of SIP query evaluation, calling rename(Q, $\sigma$) means that the variables in Q must be replaced as dictated by the substitution $\sigma$. A global set V keeps track of the variables that have been in scope at any point during the function's execution. The rename(Q, σ)function recursively processes each subquery of Q. When it encounters a construct that changes variable scope, it passes the variables that come into scope to another function ad dToV. The ad dToV function uses the set V to identify each variable x that is seen in some scope and, therefore, ensures that each such x is renamed using a fresh unused variable. Note that, variables occurring in built-in expressions but not in the underlying queries are not treated as being in the scope of the query, and therefore such variables are renamed. For example, in Q= ⟨x, R, y⟩ FILTER x<z, variable z occurs only in the built-in expression and is not in the scope of Q; the variable z is renamed if it is in scope somewhere else.

There is a problem with evaluating queries with built-ins or aggregates over graphs that contain equality. The problem is that equality is handled by replacing equal resources with representatives. Moreover, it is beneficial to evaluate queries over the representatives as much as possible as this reduces the number of substitutions considered. However, such a strategy does not work with correctly with built-ins, which then see only the representatives.

Consider evaluating query Q=⟨x, rdf:type, C⟩ FILTER x=b over a graph G that contains triples ⟨a, rdf:type, C⟩ and ⟨a, owl:sameAs, b⟩. According to the semantics of owl:sameAs, applying materialisation to graph G expands G into G' that additionally contains ⟨b, rdf:type, C⟩. Evaluating Q over G' should produce substitution $\mu_1=\{x \mapsto b\}$. Note that $\mu_1$ refers to just one resource (b) out of a clique of equivalent resources.

However, RDFox uses representatives to encode G' more efficiently. Let us assume that a is chosen as a representative of b; thus, G' is represented using a graph G" that contains just the triple ⟨a, rdf:type, C⟩ and a note that a is equal to b. Evaluating Q over G" creates substitution $\mu_2=\{x \mapsto a\}$, and so the evaluation of the filter condition fails because a is not equal to b. Note that, according to the semantics of = from SPARQL 1.1, a=b is false, even if (a, owl:sameAs, b) holds. According to this definition, = is identity on IRI—that is, each IRI is equal only to itself.

Some embodiments of the present invention address this problem by expanding the equality before any built-in function evaluation. However, this introduces further problems, as illustrated by the following example.

Consider evaluating query Q=⟨x, rdf:type, C⟩ FILTER x=b AND ⟨x, rdf:type, D⟩ over a graph G that contains triples ⟨a, rdf:type, C⟩, ⟨a, rdf:type, D⟩, and ⟨a, owl:sameAs, b⟩. If should be clear that $\mu_1=\{x \mapsto b\}$ is the only answer to Q on G. However, as explained in the previous example, equality must be expanded before the evaluation of built-in functions, which will allow the evaluation of ⟨x, rdf:type, C⟩ FILTER x=b to produce $\mu_1$. But then, eval(⟨x, rdf:type, D⟩, $\mu_1$)=0 because substitution $\mu_1$ maps x to b, but the representative graph contains only ⟩a, rdf:type, D⟩.

To formalise the solution to this problem, two auxiliary operators that allow manipulation of representatives are introduced. In particular, for r a resource, function r(r) returns the representative of r (which can be r in case r is chosen as a representative of itself). Moreover, #(r) returns the number of resources that r represents. For μ a substitution and z a vector of variables, r(μ, z) is the substitution obtained from μ by replacing the value of each x∈i) with r(x).

In addition, Table 3 includes a function ev(Q), which takes as input a query Q and returns a set of variables. One can see that ev(Q)⊆pv(Q) holds for each query Q. Intuitively, x∈ev(Q) means that the value of x will be expanded in substitutions produced by the evaluation of Q—that is, x is not mapped just to representatives, but to actual values. The definition of ev(Q) is based on the following principles:

a variable that is used in a built-in expression must always be expanded, and once a variable is expanded, it remains expanded in the inside-out evaluation of a query.

In addition, a new query EX(Q, $\vec{x}$) is introduced, which takes as input a query and a vector of variables $\vec{x}$ that satisfies $\vec{x} \subseteq pv(Q)$ and $\vec{x} \cap ev(Q)=\emptyset$, and that expands the values of $\vec{x}$ in its result. Finally, a new query QPROJECT$_\#$ $\vec{x}$ is also introduced, which takes as input a query and a vector of variables $\vec{x} \subseteq pv(Q)$. This operator projects $\vec{x}$, but in a way that preserves multiplicity.

In some embodiments, the evaluation of queries over graphs with representatives can be implemented as follows. Table 4 defines an operator that transforms a query Q into another query ε(Q). Intuitively, this operator inserts EX(Q, $\vec{x}$) subqueries into places where equality expansion is needed. As an optimisation, it is assumed that no-ops EX(Q, ∅) are always eagerly eliminated from the result of ε(Q).

Now, let G be an arbitrary graph where owl:sameAs is represented explicitly, and let G' be a graph obtained from G be replacing resources with their representatives. Then, for arbitrary query Q, $$[Q]_G=[EX(\varepsilon(Q),pv(Q)\backslash ev(Q))]_{G'}.$$

TABLE 4

| The definition of operator ε(Q) | |
| --- | --- |
| Q | ε(Q) |
| A | A |
| Q₁ FILTER E | EX(ε(Q₁), ev(Q)\ev(Q₁)) FILTER E |
| Q₁ BIND z := E | EX(ε(Q₁), (pv(Q₁) ∩ ev(Q))\ev(Q₁)) BIND z := E |
| Q₁ AND Q₂ | EX(ε(Q₁), (pv(Q₁) ∩ ev(Q))\ev(Q₁)) AND EX(ε(Q₂), (pv(Q₂) ∩ ev(Q))\ev(Q₂)) |
| Q₁ UNION Q₂ | EX(ε(Q₁), (pv(Q₁) ∩ ev(Q))\ev(Q₁)) UNION EX(ε(Q₂), (pv(Q₂) ∩ ev(Q))\ev(Q₂)) |
| Q₁ MINUS Q₂ | EX(ε(Q₁), (pv(Q₁) ∩ ev(Q))\ev(Q₁)) MINUS EX(ε(Q₂), (pv(Q₂) ∩ ev(Q))\ev(Q₂)) |
| Q₁ OPT$_E$ Q₂ | EX(ε(Q₁), (pv(Q₁) ∩ ev(Q))\ev(Q₁)) OPT$_E$ EX(ε(Q₂), (pv(Q₂) ∩ ev(Q))\ev(Q₂)) |
| AGG(Q₁, $\vec{x}$, z := f($\vec{E}$)) | AGG(EX(ε(Q₁), (pv(Q₁) ∩ v($\vec{E}$))\ev(Q₁)), $\vec{x}$, z := f($\vec{E}$)) |
| DISTINCT(Q₁) | DISTINCT(ε(Q₁)) |
| Q₁ ORDER BY $\vec{x}$ | EX(ε(Q₁), (pv(Q₁) ∩ ev(Q))\ev(Q₁)) ORDER BY $\vec{x}$ |
| Q₁ PROJECT $\vec{x}$ | ε(Q₁)PROJECT$_\#$ $\vec{x}$ |
| SUBQUERY-GROUP (Q₁) | SUBQUERY - GROUP (ε(Q₁)) |

There is another potential problem that can arise when equality reasoning is used in combination with data sources. In particular, data sources cannot be changed, and therefore RDFox cannot replace equal constants occurring in the data sources with representatives. Because of that, queries that take into account the data in the data sources could be evaluated incorrectly.

Let G be a graph containing triples $\langle b, \mathit{rdf}{:}\mathrm{type}, C \rangle$, $\langle a, \mathrm{owl{:}sameAs}, b \rangle$, and $\langle a, \mathrm{owl{:}sameAs}, c \rangle$. Moreover, assume that RDFox chooses to normalise both b and c to a that is, r(a)=r(b)=r(c)=a. Thus, the normalised graph G' contains triples $\langle a, \mathit{rdf}{:}\mathrm{type}, C \rangle$, $\langle a, \mathrm{owl{:}sameAs}, a \rangle$.

Now assume that a data source is attached to RDFox that contains a fact P(c), and consider evaluating a query $Q = \langle x, \mathit{rdf}{:}\mathrm{type}, C \rangle$ AND P(x). It is expected that $\{x \mapsto a\}$, $\{x \mapsto b\}$, and $\{x \mapsto c\}$ are all answers. However, to compute these answers using the approach described thus far, we would need to normalise P(c) that is, replace it with P(a). This, however, is impossible since tuple tables mounted from data sources cannot be modified.

In some embodiments, to address this problem, a new query NORM(Q) is introduced, which takes as input a query Q and normalises its answers. This query can be used to normalise the answers of tuple tables that cannot be modified—that is, replace every atom A containing an unmodifiable tuple table with NORM(A). Note that the result of $[\mathrm{NORM}(Q)]_G$ is a set, which means that duplicate answers are eliminated. Thus, the query transformation presented above has the same effects as if constants in data sources were normalised and duplicate facts were eliminated, which matches exactly with how triples are handled in RDFox.

Query answers can be computed inside-out as shown in Table 2. This, in fact, is the preferred way in which queries are implemented in RDF systems, and it may be appropriate for systems that store data on disk.

In contrast, RDFox uses a different query evaluation technique that involves sideways information passing. The benefits of this technique are best understood on the example of AND queries, which are by far the most common query type in practice.

For example, let $Q = \langle x, R, y \rangle$ AND $\langle y, S, z \rangle$, so Q is a join between triple patterns $\langle x, R, y \rangle$ and $\langle y, S, z \rangle$. The most obvious way to evaluate this query on a graph G is to use the following two nested loops:

for each substitution $\mu_1$ such that $\mathrm{dom}(\mu_1) = \{x, y\}$ and $\langle x, R, y \rangle \mu_1 \in G$ do for each substitution $\mu_2$ such that $\mathrm{dom}(\_2) = \{z\}$ and $\langle y, S, z \rangle \mu_1 \mu_2 \in G$ do output $\mu_1 \cup \mu_2$ Intuitively, the outer loop identifies each substitution $\mu_1$ that matches the first triple $\langle x, R, y \rangle$ in G. Each such $\mu_1$ is applied to the second triple by computing $\langle y, S, z \rangle \mu_1$, and then the inner loop identifies each substitution $\mu_2$ that matches $\langle y, S, z \rangle \mu_1$ in G. All pairs $\mu_1$ and $\mu_2$ identified in this way constitute the query output.

In some embodiments, to implement this algorithm efficiently, an index over the RDF graph is needed that supports efficient matching of atoms. The main benefit of this algorithm is that it requires very little memory: substitutions $\mu_1$ and $\mu_2$ can be enumerated one after the other—that is, at any given point in time, the algorithm just needs to store one $\mu_1$ and one $\mu_2$. Thus, the memory requirements of such a query evaluation algorithm are determined by the number of atoms, and not by the size of the RDF graph.

It may be useful to contrast this query evaluation strategy to standard databases algorithms. The above algorithm requires an index lookup in the inner loop for each substitution produced in the outer loop. Now, if the graph G is stored on disk, each such lookup can incur a substantial I/O overhead, which can make the algorithm run very slowly. Therefore, disk-based RDF systems will most likely use a different strategy: they will look up matches to $\langle x, R, y \rangle$ and $\langle y, S, z \rangle$ in the respective indexes and bring both results into memory, after which they will use either merge join or hash join to compute the final query result. Such a strategy minimises I/O cost, but at the expense of (possibly substantial) memory use while computing the join. In contrast, in systems such as RDFox, all information is already in memory and is indexed, so performing a hash join would be inefficient.

Note that the algorithm passes the values of y identified by $\mu_1$ to atom $\langle y, S, z \rangle$, which is used to restrict the set of substitutions $\mu_2$ that match atom $\langle y, S, z \rangle \mu_1$. Thus, $\mu_1$ can be seen as being 'passed sideways' to the second atom. More generally, a query evaluation technique is said to use sideways information passing if the answers to one subquery are used to restrict the answers to another subquery. Numerous such techniques exist in the literature, and RDFox uses one particular variant. Note that the technique described in the previous paragraph does not use sideways information passing: atoms $\langle x, R, y \rangle$ and $\langle y, S, z \rangle$ are evaluated independently, and the answers to neither atom restrict the answers to the other one.

This section describes the basic idea of how sideways information passing can be extended to all SPARQL queries. All algorithms assume that all variables have been renamed uniquely as shown in Table 1, as this simplifies the presentation. Query evaluation is realised using the recursive function eval, which returns multisets of substitutions. Some examples of query evaluation algorithms 800, 900 are shown in FIGS. 8 and 9, as implemented in RDFox. For simplicity of presentation, these result sets are not represented explicitly; rather, it is assumed that the result set is initialised to the empty multiset when the function is invoked, that the output statement adds substitutions to this multiset, and that the multiset is returned when the function finishes. The algorithms use global key-value maps AGT, DST, and SQT, as well as local key-value maps. For each map M, the value of M for key k is represented as M[k]; moreover, M can also be viewed as a set of key-value pairs $\langle k, v \rangle$. In the algorithm for SUBQUERY GROUP $\langle \langle 2_1 \rangle \rangle$, the value of SQT is another map, so one can write $\mathrm{SQT}[k_1][k_2]$.

In some embodiments, to capture the idea of sideways information passing, the function eval takes as argument a substitution a. This substitution essentially represents an answer to an earlier subquery, and the job of function eval is to compute all results of the given subquery that are compatible with a. Formally, this means that eval exhibits the following property: for each graph G, query Q, and a substitution a, $$\mathrm{eval}(Q, \sigma) = \{\sigma \cup \mu \mid \mu \in [Q]_G \text{ and } \sigma \sim \mu\}.$$

In other words, eval(Q, σ) can be understood as evaluating subquery Q in the 'context' of a partial substitution a. Then, a top-level query Q can be answered by calling eval(Q, ∅)—that is, one simply passes to eval the empty substitution as the context.

The general idea of the query evaluation algorithms 800, 900 is to use σ to restrict the evaluation of every subquery as much as possible. However, to respect the semantics of SPARQL, in many cases one cannot pass the entire substitution a to the subquery. This is best demonstrated using the following example.

Let $Q=Q_1$ FILTER ! bound(z) and $Q_1 = \langle x, R, y \rangle$ UNION $\rangle$ x, S, z$\rangle$, where the built-in function bound(z) returns true if variable z is bound in the current substitution. Moreover, let G={$\langle$ a, R, b$\langle$, $\rangle$ a, S, c$\rangle$}, and let $\sigma=\{x \mapsto a, z \mapsto c\}$.

First consider the desired answer to Q on G. By applying the semantics of SPARQL from Table 2, the following intermediate results are obtained:

$$[Q_1]_G = \{\{\{x \mapsto a, y \mapsto b\}, \{x \mapsto a, z \mapsto c\}\}\}$$

$$[Q]_G = \{\{\{x \mapsto a, y \mapsto b\}\}\}$$

But then, substitution $\{x \mapsto a, y \mapsto b\}$ is compatible with substitution a, so therefore eval(Q, $\sigma$) must return the substitution $\{x \mapsto a, y \mapsto b, z \mapsto c\}$.

Now consider what would happen if, in eval(Q, $\sigma$), the entire substitution a was passed to the subquery $Q_1$. Since eval($Q_1$, $\sigma$) must return each extension of a compatible with an answer to $Q_1$, the following must hold:

$$eval(Q_1, \sigma) = \{\{\{x \mapsto a, y \mapsto b, z \mapsto c\}, \{x \mapsto a, z \mapsto c\}\}\}.$$

But then, variable z is bound in all substitutions in eval($Q_1$, $\sigma$), and so expression ! bound(z) returns false on each substitution; thus, eval(Q, $\sigma$) would incorrectly return the empty set.

To address this problem, eval(Q, $\sigma$) passes to $Q_1$ only the mappings of $\sigma$ for variables that will be surely bound when evaluating $Q_1$. In other words, instead of passing $\sigma$, the algorithm filters or removes from a all mappings for the variables that occur in E and pv($Q_1$), but not in sv($Q_1$). In the example discussed above, this ensures that the value of z is removed from $\sigma$, so only substitution $\sigma'=\{x \mapsto a\}$ is passed to $Q_1$, thus ensuring $$eval(Q_1, \sigma') = \{\{\{x \mapsto a, y \mapsto b\}, \{x \mapsto a, z \mapsto c\}\}\}.$$

This allows the algorithm to correctly evaluate the filter condition. Moreover, since the mapping for z was not considered when evaluating $Q_1$, the algorithm filters out the results that are compatible with $\sigma$ (using condition $\sigma \sim \mu$) and then adds a to the result (by returning $\sigma \cup \mu$). Hence, the algorithm correctly gets $$eval(Q, \sigma) = \{\{\{x \mapsto a, y \mapsto b, z \mapsto b\}\}\}.$$

An analogous principle is used in the remaining query cases: the algorithm identifies the portion of $\sigma$ that can be passed to one or more subqueries, and it filters out the results in a way that ensures compliance with Table 2. The most complex cases are for $Q_1$ MINUS $Q_2$ and $Q_1 OPT_E Q_2$, and the following example discusses the latter.

In some embodiments of the system, the algorithm 'cleans' (filters) the substitution a by removing all variables that can be bound by $Q_2$ that are not known to be bound by $Q_1$. In our example, the 'cleaned' version of a contains only mapping $x \mapsto a$, so the outer loop returns only $\mu_1 = \{x \mapsto a\}$. This $\mu_1$ is passed to $Q_2$ in the inner loop, which considers $\mu_2 = \{x \mapsto a, y \mapsto b\}$; however, since a is not compatible with $\mu_2$, nothing is output inside the loop. At the same time, variable joins is set to true, so nothing is output after the inner loop either. Note that the values of sv($Q_1$) are kept, so there is still benefit to sideways information passing. Analogous problems arise in $Q_1$ MINUS $Q_2$, with an additional complication due to dom($\mu_1$)$\cap$dom($mu_2$)=$\emptyset$ in the definition of the semantics of $Q_1$ MINUS $Q_2$. This can happen only if sv($Q_1$)$\cap$sv($Q_2$)=$\emptyset$, in which case sideways information passing cannot be used: $Q_2$ must be evaluated 'from scratch' for each $\mu_1$ so that one can check the condition. One can hope that this will happen rarely; thus, in reasonable cases (i.e., if sv($Q_1$)$\cap$sv($Q_2$)$\neq\emptyset$ holds), dom($\mu_1$)$\cap$dom($\mu_2$)$\neq\emptyset$ surely holds for each $\mu_1$ and $\mu_2$, so sideways information passing can be used.

For AGG($Q_1$, $\vec{x}$, z:=$f(\vec{E})$), only the bindings for the variables in sv($Q_1$) can be passed to $Q_1$ because the answers to $Q_1$ must be correctly grouped. Analogous reasoning applies to DISTINCT($Q_1$) and Q ORDER BY $\vec{x}$.

While removing bindings reduces the possibility for sideways information passing, distinguishing surely bound variables from possibly bound variables minimises the amount of information that cannot be passed sideways. In particular, for queries without complex nesting of BIND, OPT, and UNION operators (which is usually the case in practice), the surely bound variables and the possibly bound variables coincide. Thus, most cases encountered in practice will enjoy maximal sideways information passing.

In some embodiments, implementations for AGG($Q_1$, $\vec{x}$, z:=$f(\vec{E})$) and DISTINCT($Q_1$) use global tables AGT and DST to restore bindings produced by the inner queries. This is not strictly necessary: one could achieve the same effect by wrapping each of those operators in a subquery-group operator. However, practical experiments have revealed two problems when using aggregates and distinct in nested queries. First, reinitialisation of the aggregation/distinct set on each call of the nested query takes quite a bit of time as it involves expensive system calls. Second, it turns out that the subqueries quite often would be evaluated for the same bindings over and over, thus necessitating a subquery-group. This, in turn, would just introduce unnecessary complication by evaluating the nested query and then copying the results. Because of that, it seems to makes sense to integrate subquery-group into the core of the engine, which is achieved using AGT and DST. In the case of distinct, this has a downside: the subquery must be evaluated fully before any results can be returned. Because of that, the algorithms also contain a nonblocking version. In practice, the nonblocking version should be used for top-level distinct operators, and the nested version should be used in all other cases.

In some embodiments. however, manipulating substitutions individually would be quite inefficient: the domain of the substitutions in an answer set can vary, so the algorithms need to keep iterating over different sets. It is much more efficient if the domains of the relevant substitutions can be determined in advance (i.e., during query compilation), so that algorithms can iterate over predetermined sets. The key to this optimisation is determining the structure of substitutions that are passed to and returned from eval.

Towards this goal, a function outVars is defined, which takes as input a query Q and two sets of variables S and P such that S$\subseteq$P. Again, the algorithm expects that variable scope in Q has been renamed as specified in Table 1. The function returns a pair $\langle S', P' \rangle$ :=outVars(Q, S, P) of sets of variables. For each query Q and sets S and P of variables satisfying S$\subseteq$P, the following properties hold:

S$\subseteq$S', P$\subseteq$P', and S'$\subseteq$P'; and for each RDF graph G and each substitution $\sigma$ such that S$\subseteq$dom($\sigma$)$\subseteq$P, each substitution $\sigma'\in$eval(Q, $\sigma$) satisfies S'$\subseteq$dom($\sigma'$)$\subseteq$P'.

The second property says that, if S and P are variables that are surely and possibly, respectively, bound by a substitution a passed to eval(Q, $\sigma$), then variables S' and P' are surely and possibly, respectively, bound in each substitution produced by eval(Q, σ). Note that $\langle S_2, P_2 \rangle$ is not used to compute the result in case of $Q_1$ MINUS $Q_2$, but the algorithm still contains the recursive call for $Q_2$ to show how the bindings are passed to $Q_2$. The cases for various query types correspond directly to how the substitutions are passed among queries in algorithms 800, 900. If Q is a top-level query, then outVars(Q, Ø, Ø) computes the variables that are surely and possibly bound, respectively, in each answer to Q. The first property reflects certain consequences of the second property.

Algorithms 800 and 900 manipulate sets of substitutions, which would be quite inefficient in practice: for each substitution, one would need to track the variables that the substitution is defined on; and moreover allocating and deallocating substitutions would take quite a bit of time. Instead of representing each substitution separately, RDFox represents substitutions as arrays, where each variable corresponds to a slot in the array. Moreover, instead of allocating substitutions and storing them in various sets, RDFox aims to work as much as possible on just one global substitution, which is extended as computation progresses. Such an approach saves quite a bit of copying; for example, when evaluating AND queries, each conjunct is preconfigured so that it produces the values in the appropriate place in this global array. In this section, the basic algorithms are reformulated along these lines into a form that is quite close to what is actually implemented in RDFox.

The algorithms discussed in this specification capture this idea by maintaining a global substitution σ. An auxiliary class TermArray assigns a unique ArgumentIndex integer to each variable and constant from a query, and a is implemented as an array over argument indexes. This array also contains the constants from a query, but this is irrelevant to the algorithms presented here. Now manipulating σ in the algorithms as an array would be quite cumbersome, so the algorithms still treat σ as an associative key-value map indexed by the variable name. Thus, σ[x] is the slot for variable x, and σ[x]:=v updates the value of a on variable x to v. Value v can be a special 'undefined' value E; this symbol is deliberately equal to the symbol that indicates 'error' in built-in evaluation since this simplifies the presentation. The algorithms also often involve copying the values of some variables from a, which is achieved using the notation for substitution restriction. For example, σ|$_v$ is the 'copy' of the slots of a for the variables from a set V. This copy contains also the slots with 'undefined' values, and so it completely represents the relevant subset of σ.

In some embodiments, a subquery Q' can occur in a query Q more than once, and each of these instances of Q' are likely to return different answers. Thus, query evaluation algorithm must distinguish different occurrences of Q' in Q. To facilitate that, the algorithms discussed in this specification operate on the parse tree of a query. In particular, they assume that the query is represented as a tree where each node n is associated with the following information.

n. Q is the query subexpression associated with node n.

$n_1, \ldots, n_k$ are the children of n, where the number k is determined by the type of the subexpression n. Q associated with n.

n. $S_{in}$ and n. $P_{in}$ are the sets of variables that are surely and possibly, respectively, passed to n. Q. These sets can be computed as follows: call outVars($n_{root}$. Q, Ø, Ø) for the query root node $n_{root}$, and, in each recursive invocation for node n, set n. $S_{in}$ and n. $P_{in}$ to the sets S and P passed to n.

To evaluate a query, RDFox compiles a query into a tree of iterators that evaluate different portions of the query without storing intermediate substitutions whenever possible. The refined algorithms follow this approach, which makes them one step closer to the actual implementation in RDFox. In particular, each node n in the query parse tree is associated with an iterator whose job is to produce the substitutions corresponding to eval (Q. Qn, σ). The iterator can be opened using function n. open and advanced using function n. adv. The iterators will update the global substitution σ, but, to ensure correctness, they must obey the following rules.

When n. open is called, σ|$_{n.P_{in}}$ determines the input substitution from Algorithms 700 and 800.

An iterator is advanced by calling n. adv. For this operation to work correctly, the values in σ of the variables from pv(n. Q) must be the same as after the most recent n. open/n. adv call.

Both n. open and n. adv produce tuples by updating in a the variables in pv(n. Q). Only the variables in pv(n. Q)\{x∈n. $P_{in}$|σ[x]≠∈} need to be updated because the values of pv(n. Q) n {x∈n. $P_{in}$|σ[x]=∈} are given by the input substitution at the point when the iterator is opened.

Both n. open and n. adv return an integer that determines the multiplicity of the current tuple. A value of zero indicates that the iterator has been exhausted.

Once an iterator has been exhausted, the values in a of the variables from pv(n. Q)∩n. $P_{in}$ must be left in the same state as when the iterator was opened.

The fourth property from the above list may sound somewhat mysterious, so here is an example demonstrating why this is important. Let $Q_1$ be a query with pv($Q_1$)={x} and sv($Q_1$)=Ø, let $Q_2$=$\langle$ y, rdf:type, A$\rangle$, let $Q_3$=$\langle$ x, rdf:type, B$\rangle$, and let Q=($Q_1$ AND $Q_2$) AND $Q_3$. As a result, variable x is possibly but not surely bound in the input to $Q_3$. Now consider an evaluation where $Q_1$ does not bind x, $Q_2$ binds y to $i_1$, and $Q_3$ binds x to $j_1$ and returns a tuple, and then binds x to $j_2$ and returns a tuple. Now assume that the iterator for $Q_3$ does not restore the value $n_3$. $P_{in}$; thus, value $j_2$ is left in the slot for x in a. Then, assume that $Q_2$ binds y to $i_2$, and we are back to evaluating $Q_3$. Since x contains a stale value $j_2$ for x, the iterator for $Q_3$ will assume that this is the binding passed to it and will produce only $j_2$, thus omitting the solution where x is bound to $j_1$. To avoid this, after its first evaluation, the iterator for $Q_3$ must restore the state of the a and thus delete the binding for x, so that the value for x is unbound when the iterator is invoked the second time.

In some embodiments, the query evaluation component of RDFox essentially implements the n. open and n. adv functions for the different iterator types, each of which corresponds to a query type. However, presenting the pseudocode for these functions explicitly would hide the main ideas behind these algorithms: the main concern here is to show how exactly the global substitution a should be manipulated while ensuring correctness. Therefore, for readability, instead of presenting the iterator functions explicitly, they are presented as generators. Essentially, a generator is a function that produces a sequence of values using a special yield statement; however, these values are not produced in advance, but are synthesised on demand. The function is accessed through an iterator interface: each time the function executes the yield statement, the function execution is suspended and the next value is returned; and each time the advance function is called, the function execution is resumed. It is important to understand that RDFox does not use a generator implementation. Rather, generators are used just to simplify the presentation of the algorithms, and these algorithms are (manually) converted into implementations of the corresponding n. open and n. adv functions.

The algorithms assume that the variables have been renamed. This is important because it eliminates possible collisions between variables from different query subparts. The algorithms use the following auxiliary functions:

Given two values $v_1$ and $v_2$, function matches($v_1$, $v_2$) returns true if and only if $v_1 = \in$, or $v_2 = \in$, or $v_1 = v_2$.

Given two substitutions $\beta$ and $\sigma$ and a set of variables V such that $V \subseteq \text{dom}(\beta)$ and $V \subseteq \text{dom}(\sigma)$, function matches ($\beta$, $\sigma$, V) returns true if and only if matches($\beta[x]$, $\sigma[x]$)=true for each $x \in V$.

Given two values $v_1$ and $v_2$ such that matches($v_1$, $v_2$)=true, function join ($v_1$, $v_2$) returns $v_1$ if $v_1 \neq E$, and otherwise it returns $v_2$. (The function value is irrelevant if matches($v_1$, $v_2$)=false.)

The correctness of the iterator-based algorithms is captured by the following statement.

For each query parse tree and each node n in it, and for each substitution $\mu$, exactly all substitutions from eval(n. Q, $\mu|_{n.P_{in}}$) are produced in $v|_{n.P_{in} \cup pv(n.Q)}$ (where a is the global substitution from the iterator algorithms) if $\mu|_{n.P_{in}}$ is written into a and then the iterator is enumerated by calling n. open and n. adv exhaustively.

Figure 3:
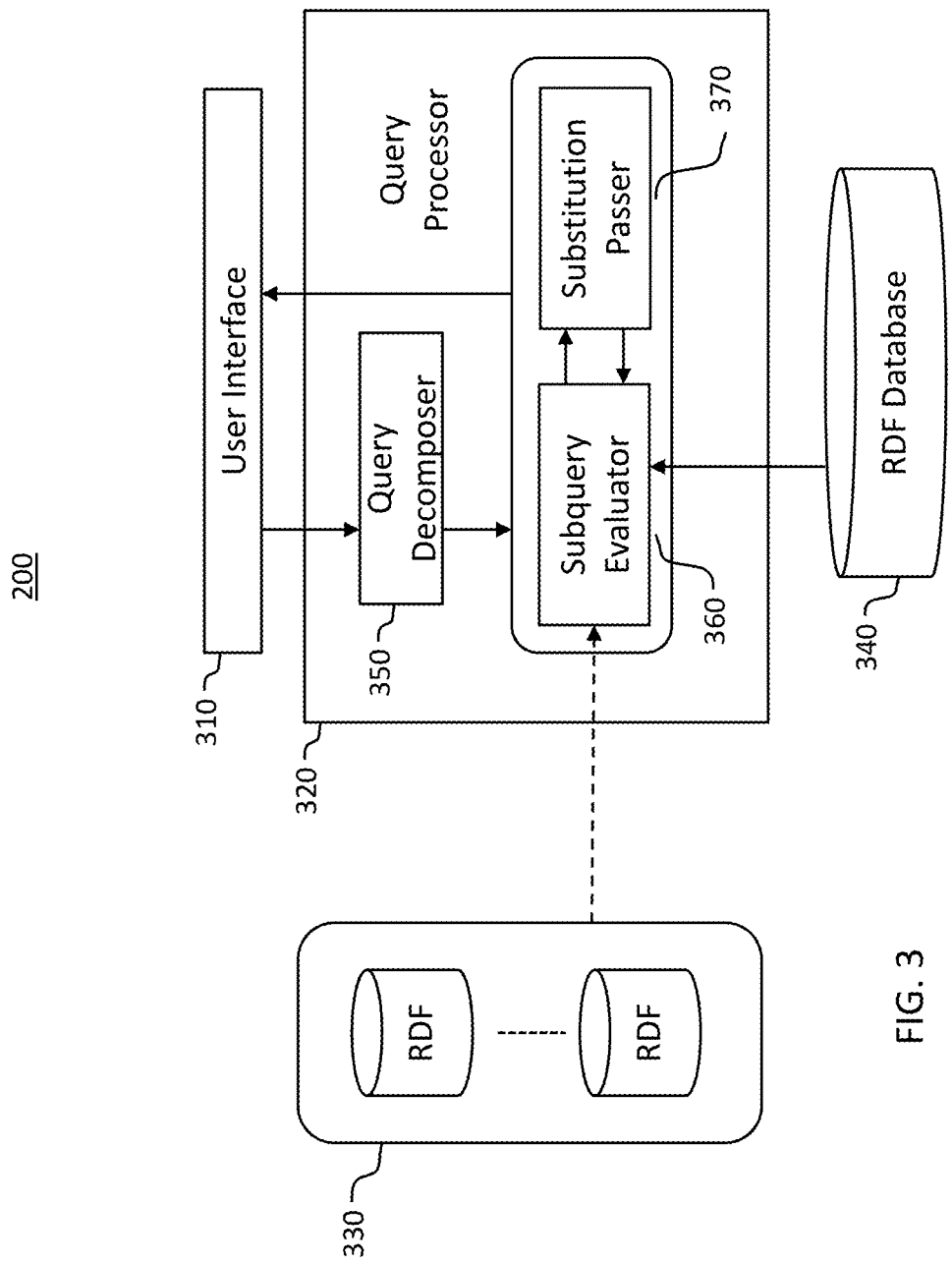
FIG. 3 shows a query evaluation system, according to some embodiments of the present invention.

According to some embodiments of the invention, the system 100 includes some or all of the query evaluation system 200 shown in FIG. 3, or vice versa. In this regard, FIG. 3 illustrates a query evaluation system 200, according to some embodiments of the present invention. The query evaluation system 200 may be a particular implementation of the system 100, according to some embodiments. The query evaluation system 200 may include one or more user interfaces 310, a query processor 320, one or more remote databases 330, and one or more central databases 340. In some embodiments, the data stored in the databases 330, 340 is in the form of an RDF graph. In some embodiments, the data stored in the databases 330, 340 is converted to an RDF graph. In some embodiments, the query processor 320 is programmed to execute instructions to receive one or more queries from a user interface 310. In some embodiments, the query processor 320 may include a query decomposer 350 that analyses the query received from the user interface 310, decomposes the query into a plurality of subqueries, represents the plurality of subqueries as a query tree, and generates a query evaluation plan. In some embodiments, the query processor 320 may execute the query evaluation plan over an RDF graph to evaluate the query.

In some embodiments, the query processor 320 may include a subquery evaluator 360 and a substitution passer 370 that iterate over the query tree to evaluate the query based at least on the query evaluation plan. In some embodiments, the subquery evaluator 360 receives data from one or more of the databases 330, 340. In some embodiments, the data is an RDF graph or converted into an RDF graph. In some embodiments, the subquery evaluator 360 uses pattern matching to map a partial graph representing a subquery to the RDF graph. In some embodiments, the subquery evaluator 360 outputs one or more substitutions that map variables to constants in the graph as a result of the graph (pattern) matching. In some embodiments, the subquery evaluator 360 applies a unary operator to a subquery for evaluation. In some embodiments, the subquery evaluator 360 combines at least two subqueries using a non-unary operator. In some embodiments, the substitution passer 370 performs additional processing on the one or more substitutions output from the subquery evaluator 360. In some embodiments, the additional processing includes one or more of a filtration operation or an expansion operation on the one or more substitutions output from the subquery evaluator 360. In some embodiments, the substitution passer 370 provides the filtered or expanded substitutions to the subquery evaluator 360 to evaluate the next subquery in the query evaluation plan.

In some embodiments, the output from the subquery evaluator 360 after the last iteration represents a result of the query. In some embodiments, the query processor 320 may output the result of the query processing using the query evaluation plan to the user interface 310.

FIG. 4 is a high-level flowchart of a method 400 to evaluate arbitrary queries using sideways information passing (SIP) according to one aspect of the invention. In some embodiments of the system, the queries are written using SPARQL and the query evaluation is performed using RDFox, an implementation of the invention. First, in step 410, the existentially quantified variables are renamed. Next, the query is compiled into a tree structure (step 420). In step 430, rewrite optimizations are applied to the query tree. In step 440, join ordering optimizations are applied to the query tree. In step 450, variable normalization operator nodes are added to the query tree as needed. In step 460, variable expansion operator nodes are added to the query tree as needed. Finally, the query tree is compiled into an execution plan (step 470) and evaluated using SIP (step 480).

As stated above, in step 410, the existentially quantified variables are renamed. In some queries the same variable can occur in multiple subqueries in such a way that the occurrences are effectively independent (i.e. they can be treated as different variables). For example, consider the following exemplar query:

$$Q = \langle x,R,y \rangle \text{ AND } (\langle x,S,y \rangle \text{ PROJECT } x)$$

Here Q consists of two subqueries combined using the AND operator. Because of the use of the PROJECT operator in the second subquery, the variable x in the second subquery has no connection to the variable x in the first subquery: the query would have the same meaning if we substitute a new variable for x in the second subquery. For example, substituting z for x would give the following equivalent query:

$$Q = \langle x,R,y \rangle \text{ AND } (\langle x,S,y \rangle \text{ PROJECT } z)$$

Such renaming simplifies subsequent query processing as it explicates variable independence.

Introducing variable expansion operator nodes (step 460) is important for ensuring correctness of query evaluation for queries with built-in functions or aggregates over graphs that contain equality. In RDF systems such as RDFox, equality is handled by replacing equal resources with representatives. For example, if a, b, and c are all equal resources, then we choose one of them as the representative (e.g., we could choose a) and replace all occurrences of the other resources with the representative (e.g., we replace all occurrences of b and c with a). The use of representatives greatly improves efficiency, but it could lead to incorrect answers, e.g., when counting resources or if the query explicitly refers to a particular resource.

RDFox addresses this problem by rewriting the original query, adding equality expansion subqueries as needed (unnecessary equality expansion would be detrimental to efficiency). Table 2 formalizes an equality expansion operator that is used for this purpose. The operator uses a recursive case analysis of queries to determine when equality expansion is needed.

In some embodiments, the query is decomposed into a plurality of subqueries. Each subquery of the plurality of subqueries may be operated upon by a unary operator or combined with one or more other subqueries by a non-unary operator, to provide an intermediate evaluation result of the subquery. In some embodiments of the invention, step 420 includes compiling the plurality of subqueries into a query tree structure. In some embodiments of the invention, the root node of the query tree corresponds to the query, each intermediate node of the query tree corresponds to a compound subquery of the plurality of subqueries, and each leaf node of the query tree corresponds to a simple subquery of the plurality of subqueries.

In some embodiments, a first subquery of the plurality of subqueries is evaluated and a result of the evaluation of the first subquery is temporarily stored in memory as a first substitution set. The first substitution set may include one or more substitutions, each substitution including one or more variables that are mappable to one or more constants (terms) in the graph. In some embodiments, the first substitution set is a multiset of substitutions, each substitution of the multiset of substitutions defining a mapping of at least one variable to at least one constant.

In some embodiments, in a case where the first subquery is operated upon by a non-distributive query operator, an expansion of the first substitution set is performed. The expansion is based at least on replacing equivalent constants for at least one constant mapped from a variable in a substitution in the first substitution set and expands the first substitution set. In some embodiments, the expansion of the first substitution set includes adding a new substitution to the first substitution set, the new substitution being generated by replacing at least one equivalent constant for at least one constant mapped from a variable in a substitution in the first substitution set.

In some embodiments, the first substitution set is expanded when the first subquery is operated upon or includes a built-in expression or a mathematical aggregation function. In some embodiments, the first substitution set is expanded for an equal constant in the data source.

In some embodiments, the first substitution set is filtered to remove mappings that should not be passed to the next subquery in the query evaluation plan. In some embodiments, the filtration step is performed after the expansion step. In some embodiments of the system, mappings for variables that are not surely bound in the first subquery but may be possibly bound in the second subquery are identified and deleted from the first substitution set to obtain a filtered first substitution set.

In some embodiments of the present invention, a second subquery of the plurality of subqueries is evaluated based at least on the filtered first substitution set to obtain a second substitution set that satisfies the second subquery. In some embodiments, the second substitution set may be an empty set. In some embodiments, the second substitution may include one or more substitutions from the first substitution set. In some embodiments, the second substitution set may include one or more new substitutions that are consistent with the one or more substitutions in the first substitution set.

In some embodiments of the system, the output of the evaluation of the second subquery is a second substitution set. In some embodiments, the second substitution set is expanded, filtered, or both expanded and filtered, to obtain an expanded or filtered second substitution set. In some embodiments, a third subquery of the plurality of subqueries is evaluated based at least on the expanded or filtered second substitution set to obtain a third substitution set that satisfies the third subquery.

In some embodiments, the first subquery is a simple subquery representing a basic graph pattern to be matched against a portion of the RDF graph. In some embodiments, the first subquery is a simple graph (pattern) matching query. In some embodiments, the simple subquery does not involve any operators, built-in functions, or aggregation functions. In some embodiments, the second subquery and the third subquery may be a simple subquery or a compound subquery, which operates upon or combines one or more simple subqueries using a unary or non-unary operator, a built-in function, or an aggregation.

In some embodiments, the result of the evaluation of the second subquery may be output as an output substitution set. In some embodiments, the result of the evaluation of the subquery corresponding to the root node of the query tree is output as the output substitution set. In some embodiments, the query evaluation plan starts by evaluating the simple subqueries at the leaf nodes of the query tree, passing the resulting substitutions to other subqueries at the same or next level up in the query tree. This process continues iteratively, from the leaf nodes towards the root node, until all the subqueries leading up to the root node of the query tree are evaluated. In some embodiments, all subqueries at a particular branch of the query tree are evaluated before moving to the next level branch of the query tree.

In some embodiments, the query evaluation plan represents a recursion through the query tree starting at the root node representing the query, to decompose the query into a plurality of subqueries. In some embodiments, the query evaluation is performed by executing the query evaluation plan in an iterative manner, starting at the leaf nodes of the query tree and iterating until the query at the root node is evaluated.

FIG. 5 is a high-level flowchart of a method 500 of evaluating the query, according to some embodiments of the present invention. In step 510, the query is received. In step 520, a graph representing the domain knowledge, over which the query is to be evaluated, is received or generated from received data. In step 530, the query is decomposed into a plurality of subqueries, each subquery of the plurality of subqueries being operated upon by a unary operator or combined with one or more other subqueries of the plurality of subqueries by a non-unary operator.

In step 540, the plurality of subqueries is represented in a query tree, generated by arranging simple subqueries at the leaf nodes, the received query at the root node, and compound subqueries at intermediate nodes at the various branch levels of the query tree. The compound subqueries at the intermediate nodes at the branch level adjacent to the leaf nodes represent an operation on or a combination of simple subqueries at the corresponding leaf nodes of the branch. The compound subqueries at the intermediate nodes at the next branch level represent an operation on or a combination of the subqueries at the previous branch level.

In step 550, an execution plan for evaluating the subqueries, based on the query tree representation, is generated. Query evaluation starts at the leaf nodes and iteratively works through the query tree till the root node is evaluated. In step 560, the query is evaluated by executing the query evaluation plan. In some embodiments, in step 560, a first subquery is evaluated and a first substitution set is generated as a result of evaluating the first subquery. The first substitution set is sideways passed to the second subquery to be evaluated in the execution plan. The second subquery is evaluated using the first substitution set to generate a second substitution set that satisfies the second subquery. The result of this second evaluation may be output as an output substitution set if the second query is the root node or passed on to a third subquery to be evaluated in a similar manner as the second subquery. In some embodiments, one or both of optional filtration on expansion steps may be performed before passing the resulting substitutions that to the next subquery. In some embodiments, step 560 represents one iteration of a sequence of iterations, the step 560 being repeated as many times as the numbers of iterations required to evaluate the query based on the query evaluation plan.

Figure 5A:
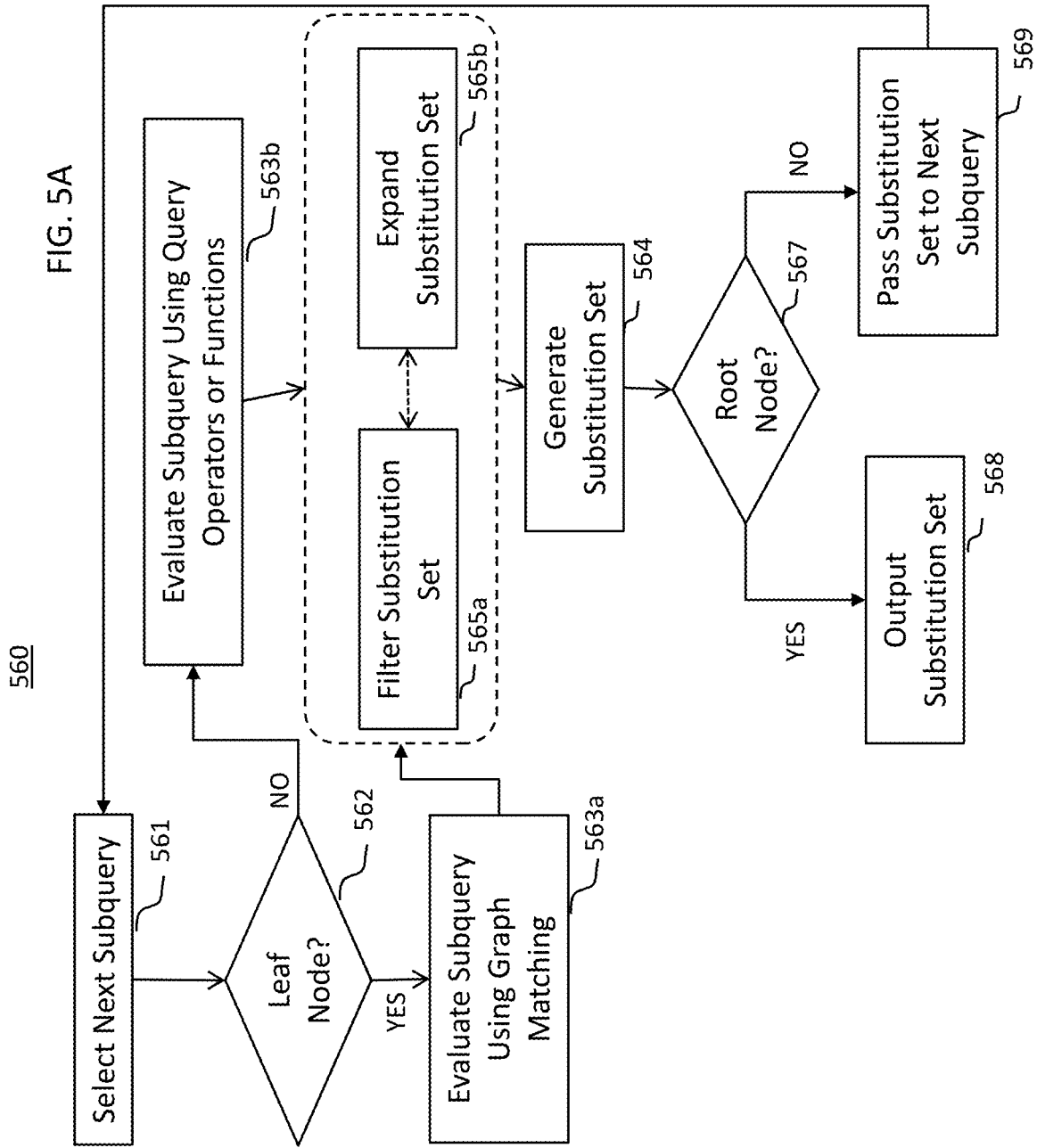
FIG. 5A is a flowchart showing the details of a method of performing the query evaluation step included in the method shown in FIG. 5, according to some embodiments of the present invention.

FIG. 5A is a flowchart showing the details of a method of performing the query evaluation step 560 of the method 500 of evaluating the query, according to some embodiments of the present invention.

In step 561, the next subquery to be evaluated is selected. In step 562, the query tree is checked to determine whether the selected subquery to be evaluated next is a leaf node. If the selected subquery to be evaluated next is a leaf node, the subquery is evaluated using graph matching in step 563a. If the selected subquery to be evaluated next is not a leaf node, the subquery is evaluated using query operators or functions in step 563b. Both steps 563a and 563b generate a multiset of substitutions as the output in step 564. In some embodiments, the substitution multiset is an empty multiset, corresponding to the case where the there are no mappings of variables to constants in the graph that satisfy the subquery. In some embodiments, the optional substitution filtering or expanding steps 565a or 565b are applied to the results from the subquery evaluation steps 563a or 563b before generating the substitution set in step 564.

In optional step 565a, one or more mappings in the substitutions obtained from evaluating the subquery, which cannot be safely passed to the next subquery to be evaluated, are identified. The identified mappings are deleted from the substitutions to generate the substitution multiset that represents the output of the subquery evaluation. In some embodiments, the mappings that cannot be safely passed to the second subquery include mappings where the mapped variable is not surely bound by the first subquery and is possibly bound by the second subquery.

In optional step 565b, in a case where the first subquery is operated upon by a non-distributive query operator, an expansion of the substitutions is performed, based at least on adding one or more new substitutions obtained by replacing equivalent constants for at least one constant mapped from a variable in at least one substitution obtained from the subquery evaluation.

In some embodiments, optional steps 565a and 565b may be performed in any order, with the result from the first operation being passed to the second operation. In some embodiments, only one of the optional steps 565a and 565b may be performed. In some embodiments, neither of the optional steps 565a and 565b are performed. In some embodiments, the step 564 of generating the substitution set may be performed before performing one of the optional steps 565a and 565b. In this regard, it is obvious to one of ordinary skill in the art that the steps of generating the substitution set (step 564), the step of filtering the substitution set (step 565a), and the step of expanding the substitution set (step 565b) can be performed as a single step or as two or more unordered steps.

In some embodiments, after the substitution set is generated in step 564, the query tree is checked to determine whether the selected subquery that was evaluated is a root node in step 567. If the selected subquery that was last evaluated is the root node, the generated substitution set (from step 564) represents the answer to the query and is output as the output substitution set in step 568. If, however, the selected subquery that was last evaluated is not the root node, there is at least one more subquery to be evaluated. In this case (NO in step 567), the process of step 560 is executed again by passing the generated substitution set to the next subquery in step 569. Thus, in some embodiments, each subquery to be evaluated represents one iteration of the process shown in step 560.

FIG. 6 shows a flowchart of a method for expanding the substitution set in step 565b, according to some embodiments. In step 610, the substitution set generated by evaluating the subquery is received. In step 620, the subquery is checked to determine whether it includes a non-distributive query operator, such as a built-in function or a mathematical aggregation. In other embodiments, in step 620, the data source is checked to determine whether it includes equivalent constants. If the determination in step 620 is "No", the process ends and the substitution set is not expanded. If the determination is step 620 is "Yes", then the substitution set needs to be expanded to account for equivalent constants. In this case (Yes in step 620), in step 630, one or more variables that are mapped to constants that have other equivalents in the graph are identified. In step 640, a new substitution that replaces a constant in the substitution set with another equivalent constant identified in step 630 is generated. In step 650, the newly generated substitution is added to the substitution set, thereby expanding the substitution set. In step 660, the expanded (or unexpanded if the determination in step 620 was "No") substitution set is returned back to the method 500. In some embodiments, if no equivalent constants are identified in step 630, no new substitutions are generated or added to the substitution set.

In some embodiments, the method 500 is implemented as a program, including a set of instructions, stored on a computer readable storage medium. In some embodiments, the program includes decomposition instructions, first evaluation instructions, first filtration instructions, and second evaluation instructions. In some embodiments, the decomposition instructions are configured to cause the data processing device system to decompose the query into a plurality of subqueries, each subquery of the plurality of subqueries being operated upon by a unary operator or combined with one or more other subqueries of the plurality of subqueries by a non-unary operator. In some embodiments, the decomposition instructions are implemented as step 530 of method 500.

In some embodiments, the first evaluation instructions are configured to cause the data processing device system to evaluate a first subquery of the plurality of subqueries and generate a first substitution multiset representing a result of the evaluation of the first subquery, the first substitution multiset including one or more substitutions, at least one substitution including one or more mappings, each mapping of the at least one substitution being a mapping from a variable to a constant in the graph. In some embodiments, the first filtration instructions are configured to cause the data processing device system to identify one or more mappings in the substitutions in the first substitution multiset that cannot be safely passed to the second subquery, and to delete the identified one or more mappings from the substitutions in the first substitution multiset to obtain a filtered first substitution multiset. In some embodiments, the first evaluation instructions and the first filtration instructions are implemented as the first iteration of step 560 of method 500.

In some embodiments, the second evaluation instructions are configured to cause the data processing device system to evaluate a second subquery of the plurality of subqueries based at least on the filtered first substitution multiset and generate a second substitution multiset representing a result of the evaluation of the second subquery using the filtered first substitution multiset. In some embodiments, the second substitution multiset includes (1) one or more substitutions of the filtered first substitution multiset, each of which may be expanded with one or more additional mappings, (2) one or more new substitutions that satisfy the second subquery, or (3) a combination of both (1) and (2).

In some embodiments, the program further comprises second filtration instructions and third evaluation instructions. In some embodiments, the second filtration instructions are configured to cause the data processing device system to identify one or more mappings in the substitutions in the second substitution multiset that cannot be safely passed to the third subquery, and to delete the identified one or more mappings from the substitutions in the second substitution multiset to obtain a filtered second substitution multiset. In some embodiments, the second evaluation instructions and the second filtration instructions are implemented as the second iteration of step 560 of method 500.

In some embodiments, the process of method 500, and step 560 in particular, is repeated iteratively until all subqueries in the query tree have been evaluated, i.e. the root node query is evaluated. The output substitution set generated as a result of the root node query evaluation corresponds to the answer to the query received in step 510.

In some embodiments, the first evaluation instructions and the first filtration instructions comprise a first iteration (step 560) of a sequence of iterations, the second evaluation instructions and the second filtration instructions comprise a second iteration (step 560) of the sequence of iterations, and the program further comprises output instructions configured to output an output substitution multiset (step 568) representing a result of evaluating a subquery in a last iteration of the sequence of iterations, the output substitution multiset representing an answer to the query. In some embodiments, the program further comprises representation instructions configured to cause the data processing device system to represent the plurality of subqueries as a query tree (step 540). In some embodiments, the root node of the query tree corresponds to the query, each intermediate node of the query tree corresponds to a compound subquery of the plurality of subqueries, and each leaf node of the query tree corresponds to a simple subquery of the plurality of subqueries.

In some embodiments, the program further comprises generation instructions configured to cause the data processing device system to generate an execution plan for evaluating the plurality of subqueries based at least on the query tree (step 550), the execution plan defining the sequence of iterations.

In some embodiments, the program further comprises expansion instructions configured to cause the data processing device system to, in a case where the first subquery is operated upon by a non-distributive query operator, determine an expansion of the first substitution multiset based at least on adding one or more new substitutions obtained by replacing equivalent constants for at least one constant mapped from a variable in at least one substitution of the first substitution multiset.

In some embodiments, the program further comprises normalisation instructions configured to cause the data processing device system to, in a case where the first subquery accesses data associated with the graph in an external repository, determine a contraction of the first substitution multiset based at least on modifying substitutions of the first substitution multiset by replacing a representative constant for at least one constant mapped from a variable in at least one substitution of the first substitution multiset and removing any duplicate substitutions from the first substitution multiset.

In some embodiments, the program includes decomposition instructions, first evaluation instructions, first expansion instructions, and second evaluation instructions. In some embodiments, the decomposition instructions are configured to cause the data processing device system to decompose the query into a plurality of subqueries, each subquery of the plurality of subqueries being operated upon by a unary operator or combined with one or more other subqueries of the plurality of subqueries by a non-unary operator. In some embodiments, the decomposition instructions are implemented as step 530 of method 500.

In some embodiments, the first evaluation instructions are configured to cause the data processing device system to evaluate a first subquery of the plurality of subqueries and generate a first substitution multiset representing a result of the evaluation of the first subquery, the first substitution multiset including one or more substitutions, at least one substitution including one or more mappings, each mapping of the at least one substitution being a mapping from a variable to a constant in the graph. In some embodiments, the first expansion instructions configured to cause the data processing device system to, in a case where the first subquery is operated upon by a non-distributive query operator, determine an expansion of the first substitution multiset based at least on adding one or more new substitutions obtained by replacing equivalent constants for at least one constant mapped from a variable in at least one substitution of the first substitution multiset. In some embodiments, the first evaluation instructions and the first expansion instructions are implemented as the first iteration of step 560 of method 500.

In some embodiments, the second evaluation instructions are configured to cause the data processing device system to evaluate a second subquery of the plurality of subqueries based at least on the expanded first substitution multiset and generate a second substitution multiset representing a result of the evaluation of the second subquery using the expanded first substitution multiset. In some embodiments, the second substitution multiset includes (1) one or more substitutions of the expanded first substitution multiset, each of which may be expanded with one or more additional mappings, (2) one or more new substitutions that satisfy the second subquery, or (3) a combination of both (1) and (2).

In some embodiments, the program further comprises second expansion instructions and third evaluation instructions. In some embodiments, the second expansion instructions are configured to cause the data processing device system to, in a case where the second subquery is operated upon by a non-distributive query operator, determine an expansion of the second substitution multiset based at least on adding one or more new substitutions obtained by replacing equivalent constants for at least one constant mapped from a variable in at least one substitution of the second substitution multiset. In some embodiments, the second evaluation instructions and the second filtration instructions are implemented as the second iteration of step 560 of method 500.

In some embodiments, the process of method 500, and step 560 in particular, is repeated iteratively until all subqueries in the query tree have been evaluated, i.e. the root node query is evaluated. The output substitution set generated as a result of the root node query evaluation corresponds to the answer to the query received in step 510.

In some embodiments, the first evaluation instructions and the first expansion instructions comprise a first iteration (step 560) of a sequence of iterations, the second evaluation instructions and the second expansion instructions comprise a second iteration (step 560) of the sequence of iterations, and the program further comprises output instructions configured to output an output substitution multiset (step 568) representing a result of evaluating a subquery in a last iteration of the sequence of iterations, the output substitution multiset representing an answer to the query.

In some embodiments, the program further comprises filtration instructions configured to cause the data processing device system to identify one or more mappings in the substitutions in the first substitution multiset that cannot be safely passed to the second subquery, and to delete the identified one or more mappings from the substitutions in the first substitution multiset to obtain a filtered first substitution multiset. In some embodiment, the mappings that cannot be safely passed to the second subquery include mappings where the mapped variable is not surely bound by the first subquery and is possibly bound by the second subquery.

It should be obvious to one of ordinary skill in the art that subsets or combinations of various embodiments described above provide further embodiments of the invention.

These and other changes can be made to the invention in light of the above-detailed description and still fall within the scope of the present invention. In general, in the following claims, the terms used should not be construed to limit the invention to the specific embodiments disclosed in the specification. Accordingly, the invention is not limited by the disclosure, but instead its scope is to be determined entirely by the following claims.

The invention claimed is:

1. One or more non-transitory computer-readable storage mediums storing a program executable by one or more data processing devices of a data processing device system to evaluate a query over a graph, the program comprising:

decomposition instructions configured to cause the data processing device system to decompose the query into a plurality of subqueries, each subquery of the plurality of subqueries being operated upon by a unary operator or combined with one or more other subqueries of the plurality of subqueries by a non-unary operator;

first evaluation instructions configured to cause the data processing device system to evaluate a first subquery of the plurality of subqueries and generate a first substitution multiset representing a result of the evaluation of the first subquery, the first substitution multiset including one or more substitutions, at least one substitution including one or more mappings, each mapping of the at least one substitution being a mapping from a variable to a constant in the graph;

normalisation instructions configured to cause the data processing device system to, in a case where the first subquery accesses data associated with the graph in an external repository, determine a contraction of the first substitution multiset based at least on modifying substitutions of the first substitution multiset by replacing a representative constant for at least one constant mapped from a variable in at least one substitution of the first substitution multiset and removing any duplicate substitutions from the first substitution multiset;

first filtration instructions configured to cause the data processing device system to identify one or more mappings in the substitutions in the first substitution multiset that cannot be safely passed to the second subquery, and to delete the identified one or more mappings from the substitutions in the first substitution multiset to obtain a filtered first substitution multiset; and second evaluation instructions configured to cause the data processing device system to evaluate a second subquery of the plurality of subqueries based at least on the filtered first substitution multiset and generate a second substitution multiset representing a result of the evaluation of the second subquery using the filtered first substitution multiset.

2. The one or more non-transitory computer-readable storage mediums according to claim 1, wherein, the second substitution multiset includes (1) one or more substitutions of the filtered first substitution multiset, each of which may be expanded with one or more additional mappings, (2) one or more new substitutions that satisfy the second subquery, or (3) a combination of both (1) and (2).

3. The one or more non-transitory computer-readable storage mediums according to claim 1, wherein the program further comprises:

second filtration instructions configured to cause the data processing device system to identify one or more mappings in the substitutions in the second substitution multiset that cannot be safely passed to the third subquery, and to delete the identified one or more mappings from the substitutions in the second substitution multiset to obtain a filtered second substitution multiset; and third evaluation instructions configured to cause the data processing device system to evaluate a third subquery of the plurality of subqueries based at least on the filtered second substitution multiset to generate a third substitution multiset representing a result of the evaluation of the third subquery using the filtered second substitution multiset.

4. The one or more non-transitory computer-readable storage mediums according to claim 3, wherein the first evaluation instructions and the first filtration instructions comprise a first iteration of a sequence of iterations, wherein the second evaluation instructions and the second filtration instructions comprise a second iteration of the sequence of iterations, and wherein the program further comprises output instructions configured to output an output substitution multiset representing a result of evaluating a subquery in a last iteration of the sequence of iterations, the output substitution multiset representing an answer to the query.

5. The one or more non-transitory computer-readable storage mediums according to claim 4, wherein the program further comprises representation instructions configured to cause the data processing device system to represent the plurality of subqueries as a query tree, wherein the root node of the query tree corresponds to the query, each intermediate node of the query tree corresponds to a compound subquery of the plurality of subqueries, and each leaf node of the query tree corresponds to a simple subquery of the plurality of subqueries.

6. The one or more non-transitory computer-readable storage mediums according to claim 5, wherein the program further comprises generation instructions configured to cause the data processing device system to generate an execution plan for evaluating the plurality of subqueries based at least on the query tree, the execution plan defining the sequence of iterations.

7. The one or more non-transitory computer-readable storage mediums according to claim 1, wherein the program further comprises expansion instructions configured to cause the data processing device system to, in a case where the first subquery is operated upon by a non-distributive query operator, determine an expansion of the first substitution multiset based at least on adding one or more new substitutions obtained by replacing equivalent constants for at least one constant mapped from a variable in at least one substitution of the first substitution multiset.

8. The one or more non-transitory computer-readable storage mediums according to claim 1, wherein the mappings that cannot be safely passed to the second subquery include mappings where the mapped variable is not surely bound by the first subquery and is possibly bound by the second subquery.

9. A method of evaluating a query over a graph, the method executed by a programmed data processing device system, the method comprising:
   decomposing the query into a plurality of subqueries, each subquery of the plurality of subqueries being operated upon by a unary operator or combined with one or more other subqueries of the plurality of subqueries by a non-unary operator;
   evaluating a first subquery of the plurality of subqueries and generating a first substitution multiset representing a result of the evaluation of the first subquery, the first substitution multiset including one or more substitutions, at least one substitution including one or more mappings, each mapping of the at least one substitution being a mapping from a variable to a constant in the graph;
   determining, in a case where the first subquery accesses data associated with the graph in an external repository, a contraction of the first substitution multiset based at least on modifying substitutions of the first substitution multiset by replacing a representative constant for at least one constant mapped from a variable in at least one substitution of the first substitution multiset and removing any duplicate substitutions from the first substitution multiset;
   identifying one or more mappings in the substitutions in the first substitution multiset that cannot be safely passed to the second subquery, and deleting the identified one or more mappings from the substitutions in the first substitution multiset to obtain a filtered first substitution multiset; and
   evaluating a second subquery of the plurality of subqueries based at least on the filtered first substitution multiset and generating a second substitution multiset representing a result of the evaluation of the second subquery using the filtered first substitution multiset.

10. One or more non-transitory computer-readable storage mediums storing a program executable by one or more data processing devices of a data processing device system to evaluate a query over a graph, the program comprising:
    decomposition instructions configured to cause the data processing device system to decompose the query into a plurality of subqueries, each subquery of the plurality of subqueries being operated upon by a unary operator or combined with one or more other subqueries of the plurality of subqueries by a non-unary operator;
    first evaluation instructions configured to cause the data processing device system to evaluate a first subquery of the plurality of subqueries and generate a first substitution multiset representing a result of the evaluation of the first subquery, the first substitution multiset including one or more substitutions, at least one substitution including one or more mappings, each mapping of the at least one substitution being a mapping from a variable to a constant in the graph;
    normalisation instructions configured to cause the data processing device system to, in a case where the first subquery accesses data associated with the graph in an external repository, determine a contraction of the first substitution multiset based at least on modifying substitutions of the first substitution multiset by replacing a representative constant for at least one first constant mapped from a first variable in at least one first substitution of the first substitution multiset and removing any duplicate substitutions from the first substitution multiset;
    first expansion instructions configured to cause the data processing device system to, in a case where the first subquery is operated upon by a non-distributive query operator, determine an expansion of the first substitution multiset based at least on adding one or more new substitutions obtained by replacing equivalent constants for at least one second constant mapped from a second variable in at least one second substitution of the first substitution multiset; and
    second evaluation instructions configured to cause the data processing device system to evaluate a second subquery of the plurality of subqueries based at least on the first substitution multiset and generate a second substitution multiset representing a result of the evaluation of the second subquery using the first substitution multiset.

11. The one or more non-transitory computer-readable storage mediums according to claim 10, wherein, the second substitution multiset includes (1) one or more substitutions of the expanded first substitution multiset, each of which may be expanded with one or more additional mappings, (2) one or more new substitutions that satisfy the second subquery, or (3) a combination of both (1) and (2).

12. The one or more non-transitory computer-readable storage mediums according to claim 10, wherein the program further comprises:
    second expansion instructions configured to cause the data processing device system to, in a case where the second subquery is operated upon by a non-distributive query operator, determine an expansion of the second substitution multiset based at least on adding one or more new substitutions obtained by replacing equivalent constants for at least one constant mapped from a variable in at least one substitution of the second substitution multiset; and
    third evaluation instructions configured to cause the data processing device system to evaluate a third subquery of the plurality of subqueries based at least on the expanded second substitution multiset to generate a third substitution multiset representing a result of the evaluation of the third subquery using the expanded second substitution multiset.

13. The one or more non-transitory computer-readable storage mediums according to claim 12,
    wherein the first evaluation instructions and the first expansion instructions comprise a first iteration of a sequence of iterations, wherein the second evaluation instructions and the second expansion instructions comprise a second iteration of the sequence of iterations, and wherein the program further comprises output instructions configured to output an output substitution multiset representing a result of evaluating a subquery in a last iteration of the sequence of iterations, the output substitution multiset representing an answer to the query.

14. The one or more non-transitory computer-readable storage mediums according to claim 13, wherein the program further comprises representation instructions configured to cause the data processing device system to represent the plurality of subqueries as a query tree, wherein the root node of the query tree corresponds to the query, each intermediate node of the query tree corresponds to a compound subquery of the plurality of subqueries, and each leaf node of the query tree corresponds to a simple subquery of the plurality of subqueries.

15. The one or more non-transitory computer-readable storage mediums according to claim 14, wherein the program further comprises generation instructions configured to cause the data processing device system to generate an execution plan for evaluating the plurality of subqueries based at least on the query tree, the execution plan defining the sequence of iterations.

16. The one or more non-transitory computer-readable storage mediums according to claim 10,
wherein the program further comprises filtration instructions configured to cause the data processing device system to identify one or more mappings in the substitutions in the first substitution multiset that cannot be safely passed to the second subquery, and to delete the identified one or more mappings from the substitutions in the first substitution multiset to obtain a filtered first substitution multiset.

17. The one or more non-transitory computer-readable storage mediums according to claim 16, wherein the mappings that cannot be safely passed to the second subquery include mappings where the mapped variable is not surely bound by the first subquery and is possibly bound by the second subquery.

18. A method of evaluating a query over a graph, the method executed by a programmed data processing device system, the method comprising:

decomposing the query into a plurality of subqueries, each subquery of the plurality of subqueries being operated upon by a unary operator or combined with one or more other subqueries of the plurality of subqueries by a non-unary operator;

evaluating a first subquery of the plurality of subqueries and generating a first substitution multiset representing a result of the evaluation of the first subquery, the first substitution multiset including one or more substitutions, at least one substitution including one or more mappings, each mapping of the at least one substitution being a mapping from a variable to a constant in the graph;

determining, in a case where the first subquery accesses data associated with the graph in an external repository, a contraction of the first substitution multiset based at least on modifying substitutions of the first substitution multiset by replacing a representative constant for at least one first constant mapped from a first variable in at least one first substitution of the first substitution multiset and removing any duplicate substitutions from the first substitution multiset;

determining, in a case where the first subquery is operated upon by a non-distributive query operator, an expansion of the first substitution multiset based at least on adding one or more new substitutions obtained by replacing equivalent constants for at least one second constant mapped from a second variable in at least one second substitution of the first substitution multiset; and evaluating a second subquery of the plurality of subqueries based at least on the first substitution multiset and generate a second substitution multiset representing a result of the evaluation of the second subquery using the first substitution multiset.

* * * * *